United States Patent
Nishikawa et al.

[11] Patent Number: 6,092,619
[45] Date of Patent: Jul. 25, 2000

[54] STEERING ASSIST SYSTEM IN A VEHICLE

[75] Inventors: Masao Nishikawa; Kenshiro Hashimoto, both of Saitama, Japan

[73] Assignee: Honda Giken Kogyo Kabushiki Kaisha, Tokyo, Japan

[21] Appl. No.: 08/852,844

[22] Filed: May 7, 1997

[30] Foreign Application Priority Data

May 9, 1996 [JP] Japan .................................... 8-114875

[51] Int. Cl.$^7$ ...................................................... B62D 5/04
[52] U.S. Cl. ................................ 180/446; 180/204
[58] Field of Search ................................... 180/167, 168, 180/169, 443, 446, 402, 403, 204; 74/41, 42; 701/41, 28

[56] References Cited

U.S. PATENT DOCUMENTS

| | | | |
|---|---|---|---|
| 5,350,912 | 9/1994 | Ishida | 250/202 |
| 5,483,453 | 1/1996 | Uemura et al. | 364/424 |
| 5,648,905 | 7/1997 | Izumi et al. | 180/169 |
| 5,663,879 | 9/1997 | Trovato et al. | 180/167 |
| 5,708,427 | 1/1998 | Bush | 180/168 |
| 5,742,141 | 4/1998 | Czekaj | 180/167 |
| 5,762,160 | 6/1998 | Shimizu | 180/169 |
| 5,765,116 | 6/1998 | Wilson-Jones et al. | 180/168 |
| 5,828,968 | 10/1998 | Iiboshi et al. | 701/23 |
| 5,850,254 | 12/1998 | Takano et al. | 180/167 |
| 5,913,375 | 6/1999 | Nishikawa | 180/167 |

FOREIGN PATENT DOCUMENTS

| | | |
|---|---|---|
| 0 640 093 A1 | 1/1993 | European Pat. Off. . |
| 246606 | 2/1989 | Japan ................................... 180/167 |
| 6-255514 | 9/1994 | Japan . |
| 2 282 241 | 3/1995 | United Kingdom . |

OTHER PUBLICATIONS

European Search Report.

*Primary Examiner*—J. J. Swann
*Assistant Examiner*—Michael Cuff
*Attorney, Agent, or Firm*—Lyon & Lyon LLP

[57] ABSTRACT

A steering assist system in a vehicle, wherein the traveling of a vehicle along a reference lane can be realized by applying a reference induction force determined in accordance with the magnitude and direction of a deviation of the subject vehicle from a reference target course (zone) established within the reference lane, and moreover, the lane change can be easily and naturally performed by a driver. A second target course (zone) is established in a second lane along which the vehicle travels after the lane change. A second induction force applied to a steering means to realize the traveling of the vehicle along the second lane is set in accordance with the magnitude and direction of a deviation of the subject vehicle from the second target course (zone). The reference target course (zone) and the second target course (zone) are connected in a connection course (zone) in which the force applied from a driving means to the steering means during the lane change is substantially "0".

53 Claims, 21 Drawing Sheets

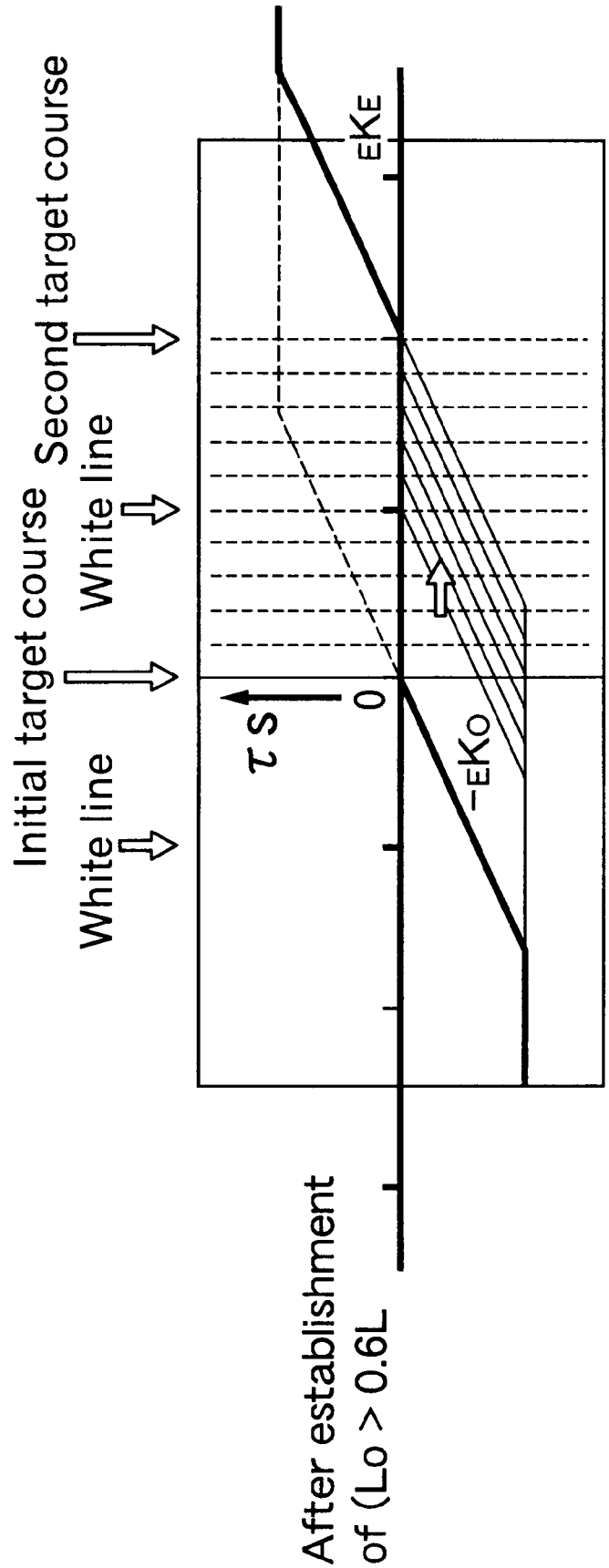

STEERING ASSIST SYSTEM IN A VEHICLE

FIELD OF THE INVENTION

The present invention relates a steering assist system in a vehicle for permitting the vehicle to continuously travel along a lane, which system includes a steering means for operating a steering wheel, and a control unit for detecting a reference lane on which the vehicle is traveling based on information concerning the road ahead of the vehicle to substantially establish a reference target course (zone) within said reference lane and for applying a reference induction force determined depending upon the magnitude and direction of a deviation of the subject vehicle from said reference target course (zone) to the steering means to cause the vehicle to travel along said reference lane.

BACKGROUND OF THE INVENTION

The present applicant has previously proposed a technique based on the above concept (Japanese Patent Application Laid-open No. 5-197423 corresponding to U.S. Pat. No. 5,350,912). In that technique, the vehicle is automatically driven exclusively by a steering assist system. On an actual road, however, a large number of insoluble problems are encountered in the automatic driving of the vehicle, e.g., when the lane change is conducted, as well as when the vehicle must swerve slightly to avoid an object which lies on the road, or when the vehicle must travel on the side of a lane, because pylons are arranged during repairing of the road. In fact, in such situations, it is required that the driver intervene in the operation of the steering assist system.

If the intervention of the driver is permitted, it is necessary to previously solve a problem of inequality between a steering angle determined by the control unit for the automatic traveling and a steering angle intended by the driver. This is because if the driver inputs a steering angle different from that in the steering assist system during operation of the steering assist system, the prior art system construed the steerage provided by the driver as an external disturbance, and an actuator works enough to realize the steering angle determined in the system. It follows that the system opposes the driver. Even if the system does not lead the opposition to the driver, if after a skirmish is once generated between the system and the person, the system suddenly stops the opposition, a disadvantage is encountered that the driver excessively steers to compensate more than necessary. If not only the system merely stops the opposition, but also urges the vehicle to travel along a new lane, there is generated a force permitting the vehicle to be dragged toward the new lane after the first opposition of the system. In this case, the excessive steerage is further considerable.

For example, if the lane change is carried out under the technique disclosed in the above Patent (Japanese Patent Application Laid-open No. 5-197423), an induction force which intends to bring the vehicle back to the original lane is applied after completion of the lane change. The magnitude of the induction force is considerably strong, because the vehicle is far away from the original lane. Thus, it is difficult to drive the vehicle along the new lane after the lane change.

A concept that the vehicle is automatically driven, for example, along each of a plurality of lanes, is disclosed in Japanese Patent Application Laid-open No. 6-255514. In this technique, an imaginary bank or incline is created in a process prepared for the lateral sides of each of the lanes, so that if the vehicle approaches a white line during traveling within the lane, a steering system functions to cause the vehicle to be brought back to the center of the lane as though the banked at the white lines on each side of each lane. In the technique disclosed in Japanese Patent Application Laid-open No. 6-255514, when the lane has been changed without operation of a turn signal blinker, it is required that the vehicle travel up the bank once and then down the bank. Apart from the problem of the force required for traveling up the bank in the existing lane, an opposite force permitting the vehicle to be brought into the new lane is applied during traveling down the bank. The driver is repulsed once and then, the repulsive force is suddenly changed to the bringing-in force. It follows that it is difficult for the driver to pass through the target course. This has a feeling as if during traveling on a road having tracks or prints for the wheels, the vehicle is shifted from one print for a wheel to another print for a wheel, and it is not possible for the driver to drive the vehicle as he desires.

In such an actual driving of the vehicle, the driver cannot afford the time to permit dissension with the system. During the dissension between the driver and the system, the lane change is high in priority, and the speed is also generally high and hence, the driver can little afford the time. Thus, an excellent man-machine interface is required and which is designed to permit the work to be shared between the system and the driver in carrying out the lane change.

For example, in the above Japanese Patent Application Laid-open No. 6-255514, it is possible to easily perform the traveling of the vehicle along the lane by means of the imaginary bank built in the process during a usual traveling. When the driver intends to try the lane change, however, if the driver's lane change intention can be perceived to decrease or eliminate the height of the imaginary bank made in the process, the lane change can be achieved easily as in the prior art.

SUMMARY OF THE INVENTION

The present invention has been accomplished with such circumstances in view, and it is an object of the present invention to provide a steering assist system for a vehicle, wherein an excellent man-machine interface is established such that normally the system exhibits an initiative, and the driver receives information of a steerage optimized to permit the traveling of the vehicle along a current lane from the system through the steering wheel, thereby achieving the steerage based on this information by himself.

To accomplish this and other objects of the present invention, in a preferred embodiment of the invention, there is provided a steering assist system for a vehicle, comprising a steering means connected to a steered wheel and also connected to a steering wheel to be able to transmit a torque from the steering wheel, a driving means for operating the steering means, and a control unit for detecting a reference current-travel lane based on information concerning the road ahead of the vehicle to substantially set a reference target course (zone) within the reference lane, and applying, to the steering means, a reference induction force determined in accordance with the magnitude and direction of a deviation of the subject vehicle from the reference target course (zone), thereby controlling the operation of the driving means to realize the traveling of the vehicle along said reference lane, wherein the control unit includes a means for substantially setting a second target course (zone) in a second lane along which the vehicle travels after the lane change, a means for determining a second induction force to be applied to said steering means in order to realize the traveling of the vehicle along the second lane, in accordance with the magnitude and direction of the deviation of the subject vehicle from the second target course (zone), and a means for connecting the reference target course (zone) and the second target course (zone) by a connection course (zone) with a force applied from the driving means to the steering means during the lane change being substantially equal to "0".

In another embodiment of the invention, there is provided a similar steering assist system for a vehicle, wherein the control unit includes a lane change confirming means for confirming the substantial execution, non-execution and completion of the lane change, a means for substantially setting a second target course (zone) in a second lane along which the vehicle travels after the lane change, a means for determining a second induction force to be applied to the steering means in order to realize the traveling of the vehicle along the second lane, in accordance with the magnitude and direction of the deviation of the subject vehicle from the second target course (zone), and a means for connecting the reference target course (zone) and the second target course (zone) by a connection course (zone) with the force applied from the driving means to the steering means during the lane change being substantially equal to "0" and for changing the connection course in accordance with the result of the confirmation by the lane change confirming means.

In another embodiment of the invention, there is provided a similar steering assist system for a vehicle, wherein the control unit includes a means for substantially setting a second target course (zone) in a second lane along which the vehicle travels after the lane change, a means for determining a second induction force to be applied to the steering means in order to realize the traveling of the vehicle along the second lane, in accordance with the magnitude and direction of the deviation of the subject vehicle from the second target course (zone), and a means for weakening at least one of the reference induction force and the second induction force on the second lane during the lane change.

Similarly, another embodiment of the invention provides the control unit with a lane change confirming means for confirming the substantial execution, non-execution and completion of the lane change, a means for substantially setting a second target course (zone) in a second lane along which the vehicle travels after the lane change, a means for determining a second induction force to be applied to the steering means in order to realize the traveling of the vehicle along the second lane, in accordance with the magnitude and direction of the deviation of the subject vehicle from the second target course (zone), and a means for weakening at least one of said reference induction force and the second induction force on the second lane during the lane change and for changing the situation of the weakening of the induction force in accordance with the result of the confirmation provided by the lane change confirming means.

The control unit may include an intention perceiving means for perceiving a driver's lane change intention, and be arranged to establish the connection course (zone) in response to an output from the intention perceiving means. Also, the control unit may be arranged to eliminate the connection course (zone) in response to the confirmation of the substantial completion and non-execution of the lane change by the lane change confirming means. Further, the control unit may include an intention perceiving means for perceiving a driver's lane change intention, and be arranged to start the weakening of either the reference induction force or said second induction force on said second lane in response to an output from the intention perceiving means. Still further, the control unit may be arranged to restore the reference induction force or the second induction force weakened once, in response to the confirmation of the substantial completion and non-execution of the lane change by the lane change confirming means.

Other and more detailed objects, advantages, features and the like of the present invention will be apparent to those skilled in the art from the following description of preferred embodiments and the accompanying drawings.

BRIEF DESCRIPTION OF THE DRAWINGS

FIGS. 20A, 20B and 20C are diagrams illustrating variations in induction force with the passage of time.

DESCRIPTION OF THE PREFERRED EMBODIMENTS

Figure 1:
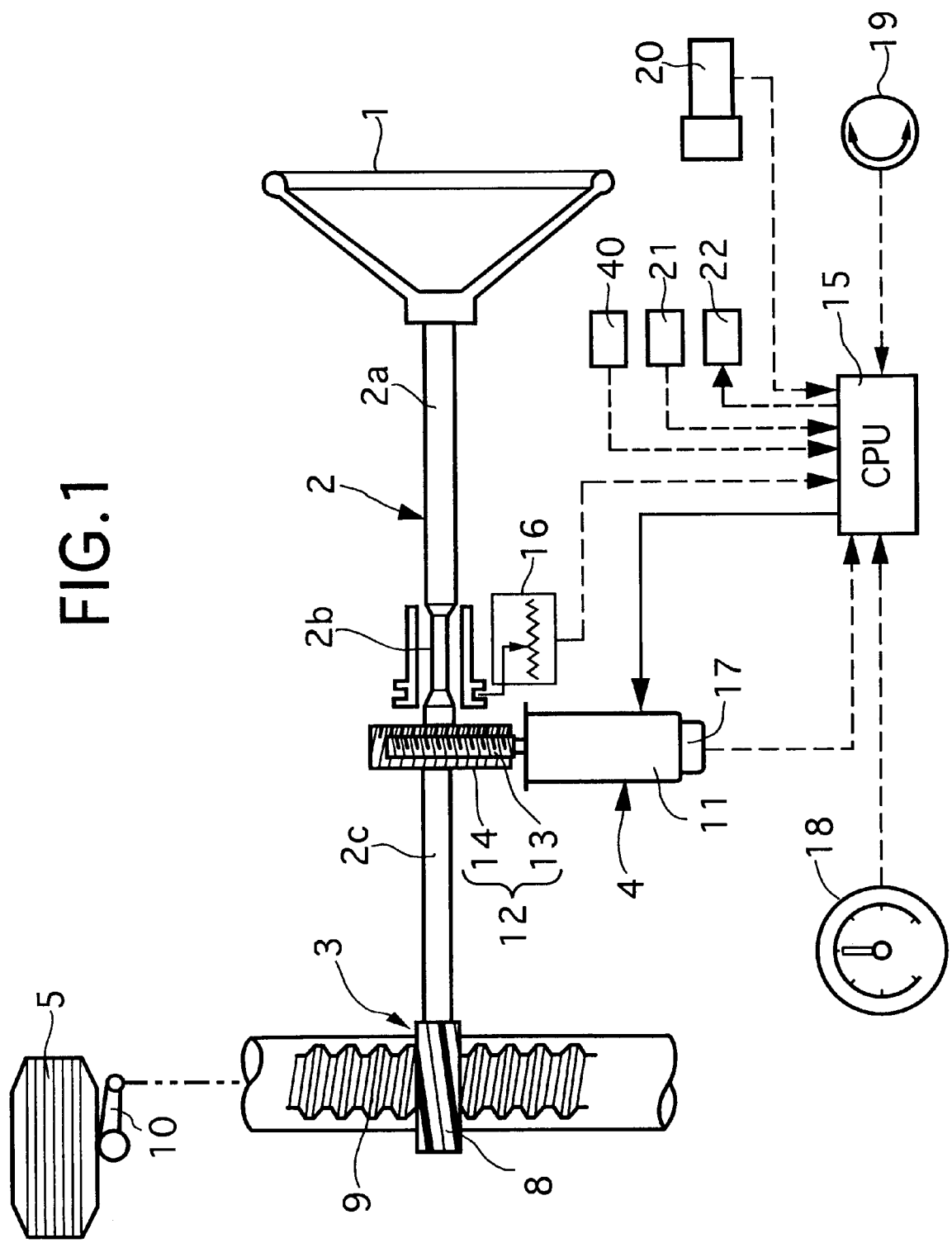
FIG. 1 is an illustration of the arrangement of a steering assist system for a vehicle according to a first embodiment of the invention.

FIGS. 1 to 11 illustrate a first embodiment of the present invention. Referring first to FIG. 1, the steering assist system for a vehicle includes a steering wheel 1 positioned to be rotated by a driver of the vehicle, a steering shaft 2 that is rotated in response to the operation of the steering wheel 1, a steering means 3 for operating a front wheel 5 as a steered wheel (the second front wheel is omitted for simplicity), a driving means 4 for operating the steering means 3, and a CPU 15 for controlling the driving means 4 as a control means.

The steering shaft 2 is comprised of a transmitting shaft portion 2a connected at one end to the steering wheel 1 and connected at the other end to one end of a transmitting shaft portion 2c through a torsion bar 2b. The other end of the transmitting shaft portion 2c is connected to the steering means 3. The steering means 3 is constructed of a rack and pinion type by a pinion 8 provided at the other end of the transmitting shaft portion 2c and a rack 9 meshed with the pinion 8. Opposite ends of the rack 9 are connected to the left and right front wheels 5 through tie rods 10, respectively. Thus, the rack 9 can be driven by the rotation of the pinion 8 (vertically in FIG. 1) and both of the front wheels 5 can be turned about their rotating axes in response to the operation of the rack 9, thereby achieving a desired steerage.

The driving means 4 is connected to one end of the transmitting shaft portion 2c of the steering shaft 2 and includes a motor 11, and a worm gear mechanism 12 for boosting an output from the motor 11 to input the boosted output to the transmitting shaft portion 2c of the steering shaft 2. The worm gear mechanism 12 is comprised of a screw gear 13 connected to an output shaft of the motor 11, and a worm gear 14 provided on the transmitting shaft portion 2c and meshed with the screw gear 13.

The operation of the driving means 4 is controlled by the CPU 15. Inputted to the CPU 15 is information provided by a steering force sensor 16 as a steering force detecting means provided on the steering shaft 2 for detecting a steering force, a steering angle sensor 17 as a steering angle detecting means which is an encoder for detecting a rotational angle of the motor 11, a vehicle speed sensor 18 for electrically detecting a vehicle speed, a yaw rate sensor 19 for electrically detecting a speed of rotation of the vehicle about its vertical axis, and a CCD camera 20 for taking an image of a situation of a road ahead of the vehicle. Connected to the CPU 15 are an SAS (steer assist system) switch 21 which is capable of switching over whether a lane induction control is carried out, an indicating lamp 22 for indicating that a lane induction mechanism is in operation, and a blinker (a conventional turn signal or direction indicator) 40 for confirming the driver's intention of changing the lane, all of which are located near the driver's seat.

The driving means 4 now will be described in more detail. An actuator having the worm gear mechanism 12 mounted on the steering shaft 2 is used in a known manner, mainly in a power steering system of a lightweight vehicle. In such a type of power steering, the steering force sensor 16 for detecting the steering force is provided in the vicinity of the worm gear mechanism 12 and on the side of the steering wheel 1. In this embodiment, both the driving means 4 and the steering force sensor 16 are used in common with a lane induction control system. The principle of the steering force sensor 16 is to convert the torsion of the torsion bar 2b caused by receiving the steering force from the driver through the steering wheel 1, into an axial rectilinear displacement by a mechanism such as a cam and to convert the displacement into an electric signal by a potentiometer or the like for providing a signal. This principle is used in a known manner.

Figure 2:
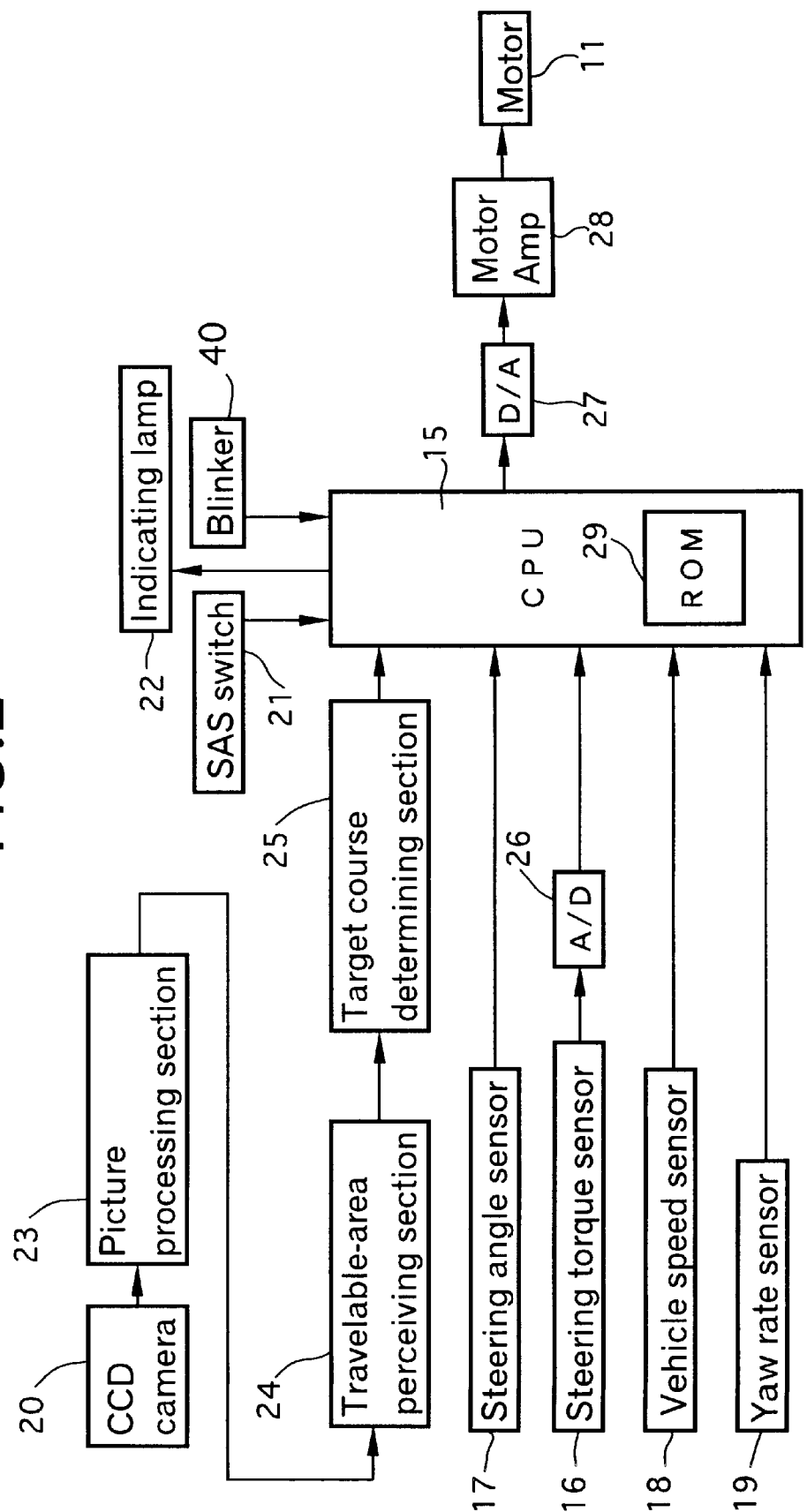
FIG. 2 is a block diagram of a control section of the system.

Referring to FIG. 2, a picture taken by the CCD camera 20 is subjected to processing such as an extraction of feature points and a though conversion in a picture processing section 23. A travelable area is searched in a travelable area perceiving section 24 based on the picture after being processed in the picture processing section 23. A scheme of a course along which the vehicle will travel from now is determined based on the result of the searching in a target course determining section 25 and is inputted to the CPU 15.

The output from the steering angle sensor 17 of the encoder type is inputted directly to the CPU 15, and the output from the steering force sensor 16 is an analog signal and hence, is inputted through an A/D converter 26 to the CPU 15. The outputs from the vehicle speed sensor 18 and the yaw rate sensor 19 are also inputted directly to the CPU 15.

A digital signal corresponding to the result of a calculation of an operation amount of the motor 11 in the CPU 15 is converted into an analog signal in a D/A converter 27. Further, this very weak analog signal is converted into an electric current value in a motor amplifier 28 and applied to the motor 11.

The CPU 15 has a memory device (ROM) 29 for storing various gains and constants required for the calculation, and if required, information in the ROM 29 is read.

The CPU 15 operates the motor 11 according to an algorithm which will be described hereinafter, thereby producing enough steering force for the vehicle to travel following a lane as induced by the driver. The front wheel 5 is deviated in an appropriate amount from the induction course in accordance with the driver's steering force applied to the steering wheel 1, and the driver receives a reaction force corresponding to the deviated amount as road information.

The arrangement illustrated herein and shown in FIGS. 1 and 2 also is basically common to the second to seventh embodiments which will be described hereinafter. When there is a small difference, it will be described in each case.

For purposes of avoiding any misunderstanding of some of the terms used hereafter to describe and claim the embodiments of this invention, such terms will be defined here.

Reference lane: A lane on which the subject vehicle is now traveling.

Reference target course: A course, the traveling of the vehicle along which the driver aims at from a reference lane on which the vehicle is now traveling (which also will be referred as a current-travel lane for simplification of the description).

Second lane: A lane on which the vehicle will travel after the lane change.

Second target course: A course, the traveling of the vehicle along which the driver aims at after the lane change.

Connection course: A travel course interconnecting the reference target course and the second target course, wherein when the vehicle travels within this course, the system does not provide any information substantially concerning the steerage.

Course (zone): This is qualified or explained by attaching "zone", because each of the three courses generally has a width. However, the width may be 0 (namely, the course may be comprised of a line) in some cases, and hence, "zone" is enclosed in parenthesis.

Induction force: Steering force information applied from the system to the driver. A source of this information is a steering angle, but the steering angle, by itself alone, is hard to deal with and hence, the direction and degree of the steerage is converted into the steering force and provided through the steering wheel. The driver feels as if the system induces the steering direction and hence, the steering force information is called the induction force.

Sign of the characters: The sign of the gain (sensitivity of a sub-system) and the reference value are specifically defined. The steering angle and the steering force are represented by a positive sign, when they are in a clockwise direction as viewed from the side of the driver, and by a negative sign, when they are in a counterclockwise direction. Thus, the rightward and leftward steerages are systematically dealt with.

Figure 3:
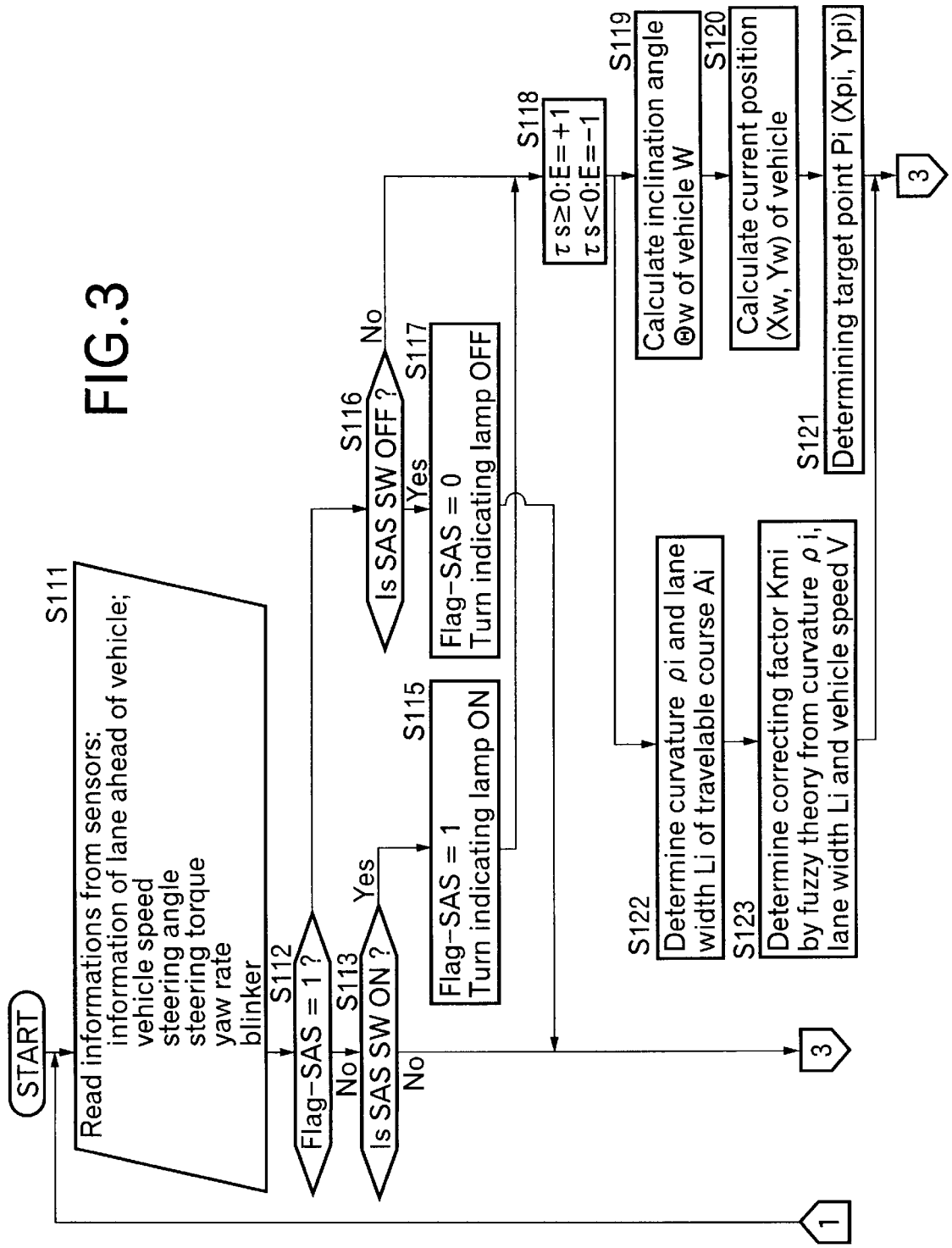
FIG. 3 is a flow chart illustrating a portion of a control algorithm in the first embodiment.
Figure 4:
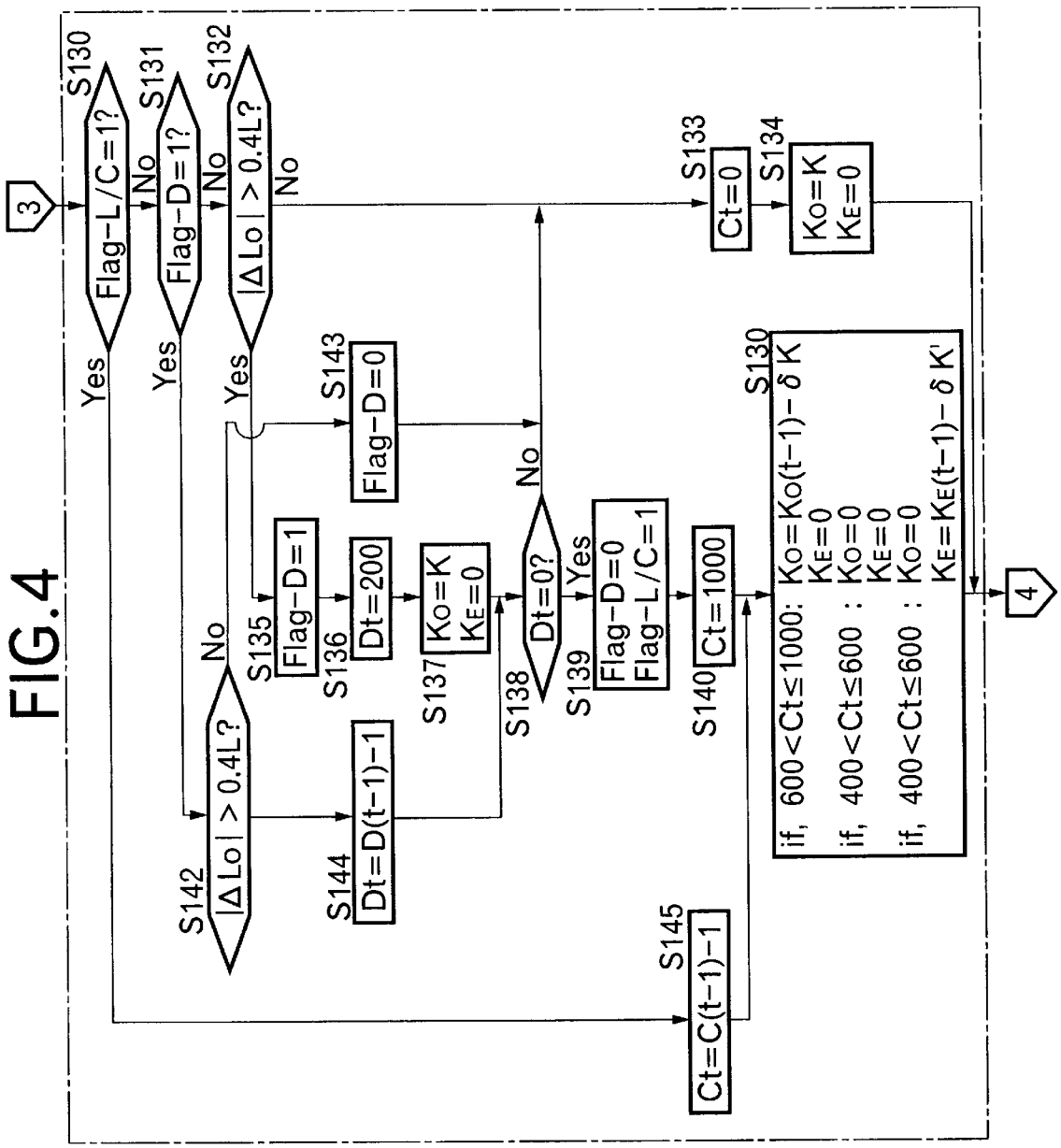
FIG. 4 is a flow chart illustrating a portion of the control algorithm in the first embodiment.
Figure 5:
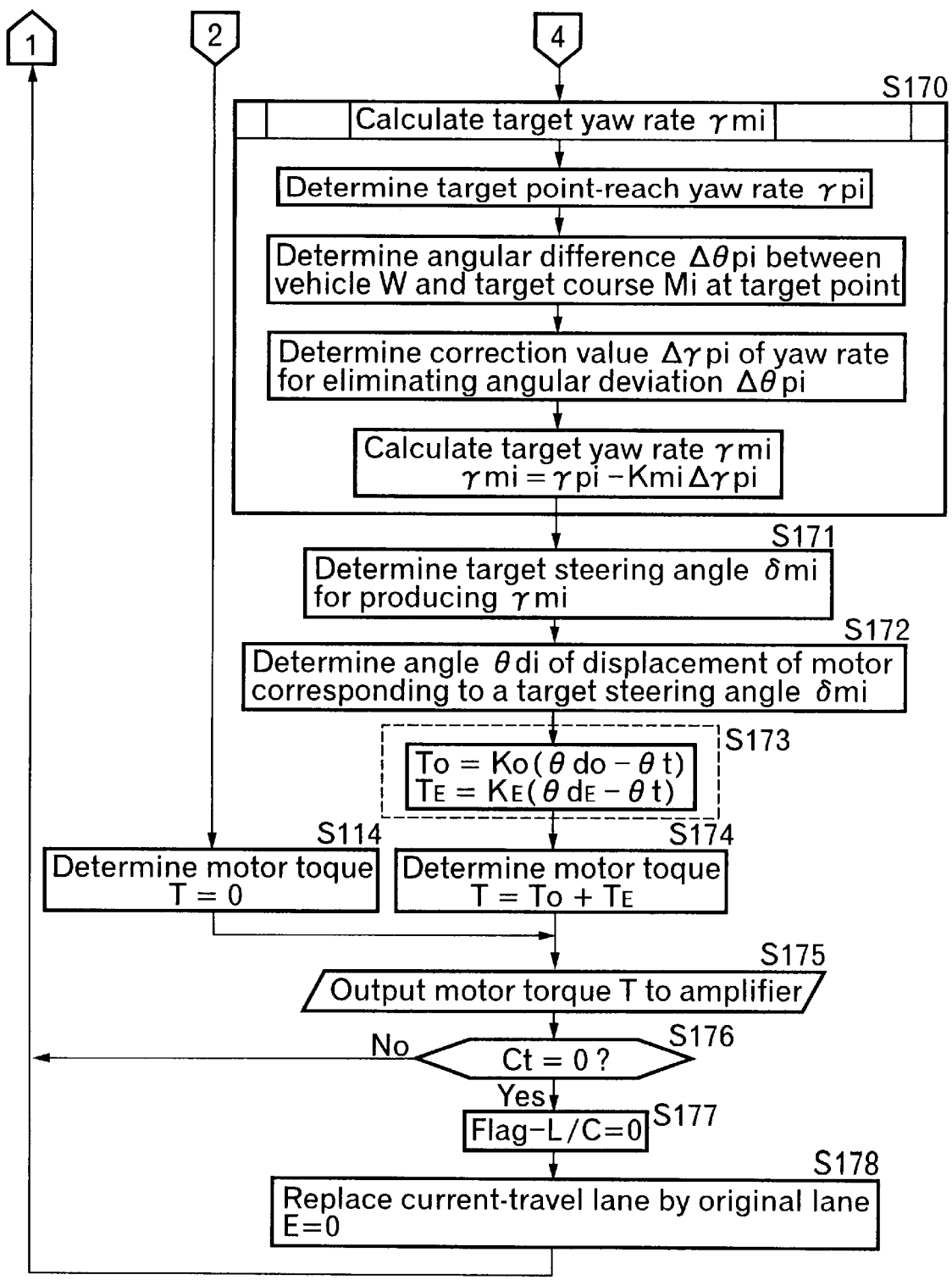
FIG. 5 is a flow chart illustrating the remaining portion of the control algorithm in the first embodiment.

FIGS. 3 to 5 illustrate a control algorithm established in CPU 15. In the embodiments which will be described hereinafter, a start cycle in this system is 5 msec in every case. The system is started when predetermined conditions have been established, such as a condition in which the engine is in operation. At step S111 in FIG. 3, information from the various sensors are read. At next step S112, it is determined whether a flag Flag-SAS is 1, i.e., whether conditions to exhibit a lane induction function are established to indicate that the system has been started. If the system is still not started, it is determined at step S113 whether the SAS switch 21 has been pushed. If the SAS switch 21 is not pushed, the processing is advanced to step S114 (FIG. 5), where the output torque to the motor 11 is determined at "0". That is, the motor 11 cannot produce any torque, and normal steering is carried out by the driver.

If it is determined at step S113 that the SAS switch 21 has been pushed, the processing is advanced to step S115, at which the flag Flag-SAS indicating that the system is being started is set at "1", and the indicating lamp 22 is turned ON, thereafter progressing to step S118. If it is determined at step S112 that Flag-SAS=1, i.e. "YES", then it is determined at step S116 whether the SAS switch 21 has been turned OFF. If the SAS switch 21 has been turned OFF, the processing is advanced to step S117, at which the flag Flag-SAS is set at "0", and the indicating lamp 22 is turned OFF, thereafter progressing to step S114. If it is determined at step S116, that the SAS switch 21 is not turned OFF, the processing is advanced to step S118.

At step S118, the signs of characters used in the calculation which will be described hereinafter are determined. That is, if the steering force $\tau s$ is positive (in a clockwise direction), the constant E is defined as being "+1", and if the steering force $\tau s$ is negative (in a counterclockwise direction), the constant E is defined as being "−1". The sign of constant E is changed depending upon the positive or negative of the steering force. In addition to the constant E, each constant having constant as an suffix in the following flow, e.g., the gain $K_E$ and the like, are governed by the above rule.

At steps S119 to S123 subsequent to step S118, the same processings as described in the prior application (Japanese Patent Application Laid-open No. 5-197423 corresponding to U.S. Pat. No. 5,350,912 which is incorporated herein by this reference) are carried out. Based on this, a target point Pi to which the vehicle is to be guided is determined, and a correcting factor Kmi used hereinafter is determined. The details thereof are fully described in the above Patent and hence, are merely described here in brief.

Figure 6:
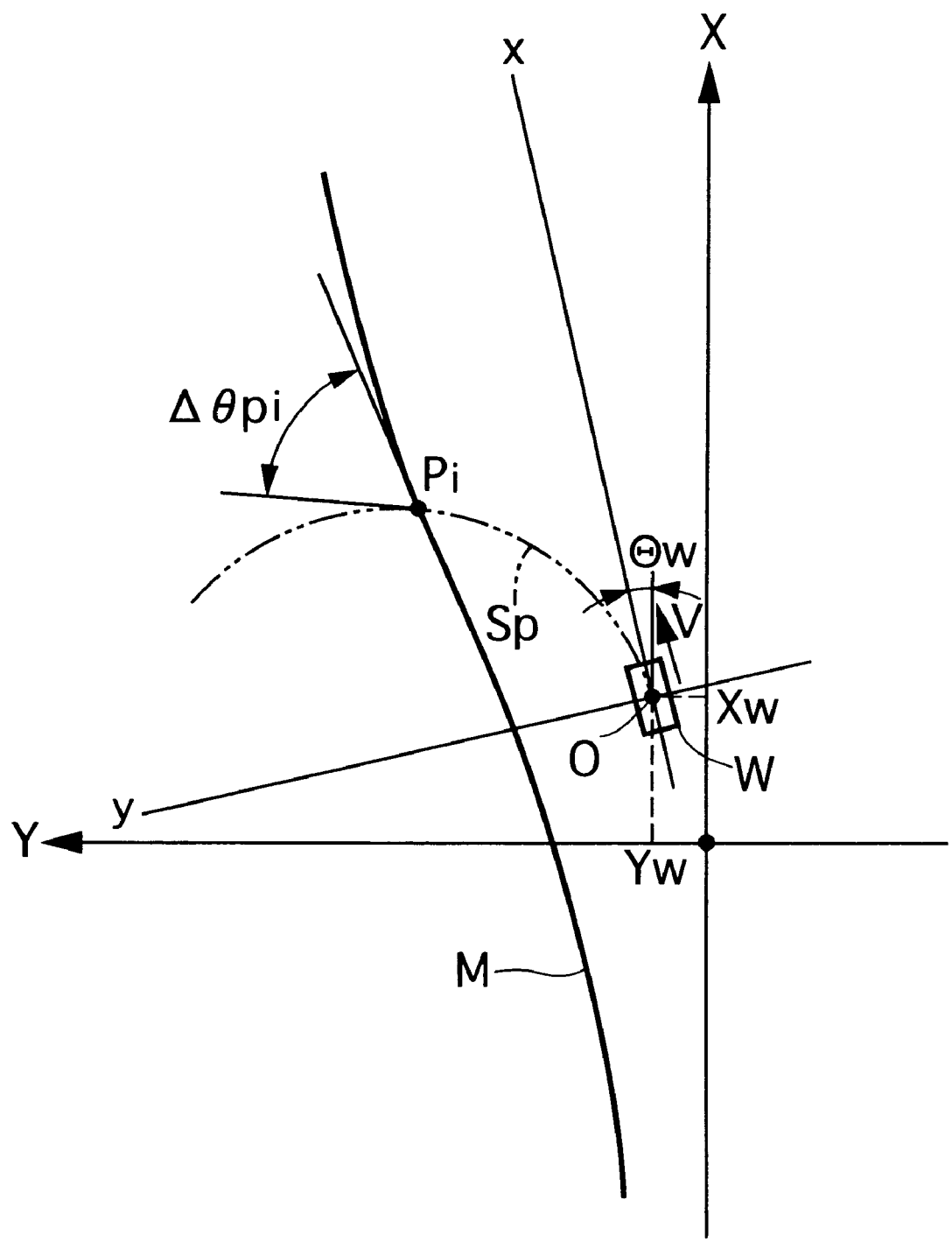
FIG. 6 is a diagram for explaining the processing in the control algorithm.

In an X-Y fixed coordinate system shown in FIG. 6, x-y relative coordinates are established, wherein the vehicle W is defined as an origin; the longitudinal direction of the vehicle is defined by an x axis; the widthwise (lateral) direction of the vehicle W is defined by a y axis; and a target course M based on picture information provided by the CCD camera 20, the picture processing section 23, the steerable-area perceiving section 24 and the target course determining section 25 is established on the x-y relative coordinates. At step S119, an inclination angle $\Theta_W$ of the vehicle W is determined. At step S120, a point $(X_W, Y_W)$ of the present position of the vehicle W on the X-Y fixed coordinate system is calculated. Further, at step S121, a target point Pi on the target course M is determined.

In parallel to the processings at steps S119 to S121, interruption processings at steps S122 and S123 are carried out. At step S122, a travelable course Ai for the vehicle is determined, and a curvature $\rho i$ of the travelable course Ai and the lane width Li are determined from the picture information. At step S123, a correcting factor Kmi is determined by a fuzzy theory from the curvature $\rho i$, the lane width Li and the present vehicle speed V. Thus, the correcting factor Kmi is determined in accordance with the determined quantities such as the curvature $\rho i$ and the lane width Li in consideration of the fact that it is difficult for the target points to smoothly converge into the target course M depending upon the curvature of the travel course.

The suffixed character $i$ is used when a plurality of lanes exist ahead of the subject vehicle, and the suffixed character $i$ indicates a numerical value for each lane. For example, for a current lane on which the vehicle is now traveling, i=0; for a lane on the right of the current lane, i=+1; for a lane on the left of the current lane, i=−1. If the constant E defined previously is used, i=E can be put in a numerical value concerned with an adjacent lane, and hence, i=E can be used commonly for the lanes on the right and left of the current lane. It should be noted that a so-called double-lane change for performing the lane-change of over two lanes at one time is not treated herein. Therefore, even on a road having four or more lanes, i assumes either one of only two values, i.e., "0" or "E".

After the processings at steps A121 and S123, the processing is advanced to step S130 shown in FIG. 4. The flow chart portion surrounded by a one-dot dashed line in FIG. 4 is a flow characterizing the first embodiment. Various embodiments from this first embodiment to a seventh embodiment will be illustrated, but the portions surrounded by the one-dot dashed line are different in the embodiments.

At step S130, it is determined whether a flag Flag-L/C is equal to "1". If the flag Flag-L/C is not equal to "1", the processing is advanced to step S131, at which it is determined whether a flag Flag-D is equal to "1". If the flag Flag-D is also not equal to "1", the processing is advanced to step S132, at which it is determined whether the deviation $\Delta Lo$ from the center of the current travel lane exceeds 40% of the lane width L. If the deviation $\Delta Lo$ is within 40% of the lane width L, it is determined the driver has no intention to change the lane, progressing to step S133. A first timer Ct is set at "0", progressing to step S134, at which the gain Ko concerned with a subject-vehicle's lane (a reference lane) is determined at a predetermined gain value K, and the gain $K_E$ concerned with an adjacent lane (a second lane) is determined at "0".

Here, the gain $K_E$ can assume any of three values, because the constant only can be one of three values "0", "+1" and "−1". To be discussed herein is only the gain $K_E$ concerned with the direction of the steering force $\tau s$, and in this embodiment, the gain $K_E$ in a direction opposite from that of the steering force $\tau s$ is defined as being always "0".

If it is determined at step S132 that the deviation $\Delta Lo$ exceeds 40% of the lane width L, the flag Flag-D for perceiving the intention of the lane change is set to "1" at step S135. At the next step S136, a second timer Dt is set at 200 (which means that a perceiving time of 1 second is provided, because the cycle time is 5 msec, i.e. 200×5 msec=1 sec). Further, at step S137, the gains Ko and $K_E$ are set at the same values as at step S134, progressing to step S138. At step S138, it is determined whether the second timer Dt has reached "0". However, the first result of the determination at step S138 is NO, to thereby return to step S133, because the timer Dt has been set at 200 (Dt=200) at step S136. If the second timer Dt has reached "0" after a lapse of 1 second as described hereinafter, the driver's intention to change the lane could be confirmed. Therefore, at step S139, the flag Flag-D is set at "0", and the flag Flag-L/C is set at "1". Then, at step S140, the first timer Ct is set at "1,000". This numeral "1,000" corresponds to 5 seconds for the same reason as in the second timer Dt.

At step S141, the gains Ko and $K_E$ are changed in the following manner in accordance with the counted value of the first timer Ct. More specifically, for the first 2 seconds (600<counted value $\leq$1,000), the gain Ko is decreased by a very small value $\delta K$ from the last numerical value and determined as a new value Ko, whenever the cycle is passed to a next run. The magnitude of the $\delta K$ is selected so that it assumes just "0" when up to 400 runs of the cycle have been passed. During this time, $K_E$ consistently remains "0". For the next 1 second of the first timer Ct (400<counted value$\leq$600), both of the two gains Ko and $K_E$ are left at "0". For the last 2 seconds (0<counted value $\leq$400), the gain Ko consistently remains "0", but the gain $K_E$ is determined at a renewed value larger than the last value by $\delta K'$ for every cycle. This value $\delta K'$ is also selected so that $K_E$ assumes just K at the time when the last 400 runs of the cycle have been passed. In this example, essentially $\delta K=\delta K'=K/400$. In general, however, an algorithm is established so that different numerals can be selected for $\delta K$ and $\delta K'$, because a case is assumed where the time when the gain Ko reaches "0" from K is different from the time when the gain $K_E$ reaches K from "0".

Figure 7:
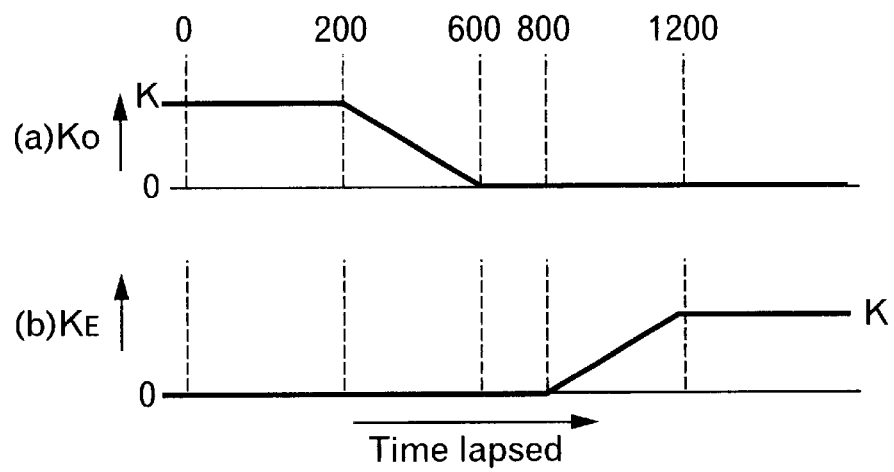
FIG. 7 is a diagram illustrating variations in gains with time.

The variations in two gains Ko and $K_E$ with the passage of time under the above-described definition are clearly shown in FIG. 7, by way of example, when the vehicle has changed the lane to a right lane. More specifically, as shown in graph (a) in FIG. 7, the gain Ko starts to be decreased in response to the start of counting of the first timer Ct after the second timer has counted 200. The gain Ko reaches "0" at the time when the first timer Ct reaches "600", i.e., after the passage of 400 more runs of the cycle. On the other hand, as shown in graph (b) in FIG. 7, the gain $K_E$ is maintained at "0" until the counted value of the first timer Ct reaches "800" after the counted value of the second timer Dt has reached "0", but thereafter, the gain Ko is increased. As can be seen FIG. 7, the two gains Ko and $K_E$ are continuously decreased and increased and changed in principal role from each other. In this case, the gain $K_{-1}$ during the lane change to a left lane is fixed to "0".

If the flag Flag-D is "1" at previous step S131, the processing is advanced to step S142, at which it is inspected again whether the deviation $\Delta$Lo exceeds 40% of the lane width L. This is because the attempt to change the lane has been made once, but the lane change might be discontinued for some reason. If it is determined at step S142 that the deviation $\Delta$Lo is lower than 40% of the lane width L, the flag Flag-D is set at "0" at step S143, even if the driver's intention to change the lane is being confirmed, and then progresses to step S133. at step S133, the first timer Ct is set "0", and at step S134, the gains Ko and $K_E$ are returned to original preset values. Conversely, if a state in which the deviation $\Delta$Lo exceeds 40% of the lane width L is being continued as a result of inspection at step S142, the second timer Dt required for determination of the intention is decreased by "1" at step S144, thereafter progressing to step S138. As a result of decreasing of the second timer Dt at step S144, Dt=0 will be established in course of time, as described above.

If the flag Flag-L/C has already assumed "1" at previous step S130, the procedure is advanced to step S145, at which an operation of decreasing the first timer Ct by "1" is carried out. In this manner, the first timer Ct is decreased one by one for every cycle.

After the gains Ko and $K_E$ are defined in the above manner, the procedure is advanced to step S170 shown in FIG. 5. The processing at steps S170 to S172 are described in detail in the prior application (Japanese Patent Application Laid-open No. 5-197423 U.S. Pat. No. 5,350,912). In brief, a target yaw rate $\gamma mi$ is calculated at step S170. In the calculation of the target yaw rate $\gamma mi$, a target point-reach yaw rate $\gamma pi$ produced during traveling of the vehicle along a phantom course Sp (see FIG. 6) before the vehicle W reaches a target point Pi is first determined. When the vehicle W has reached the target point Pi at such yaw rate $\gamma pi$, a deviation $\Delta\theta_{Pi}$ in angle between the vehicle W and the target course Mi at the target point Pi is calculated, and a correction value $\Delta\gamma_{Pi}$ of yaw rate for eliminating the angle deviation $\Delta\theta_{Pi}$ is determined. The previously determined yaw rate $\gamma pi$ is corrected by this correction value $\Delta\gamma_{Pi}$ according to the following equation, and a yaw rate resulting from the correction is determined as a target yaw rate $\gamma mi$.

$$\gamma mi = \gamma pi - Kmi \cdot \Delta\gamma_{Pi}$$

wherein the correction factor Kmi is a factor determined at step S123 described above.

Then, at step S171, a target steering angle $\delta mi$ of the front wheel 5 required for producing the target yaw rate $\gamma mi$ provided at step S170 is determined. Further, at step S172, a target value $\theta di$ of a deviation angle of the motor 11 to match the steering angle of the front wheel 5 to the target steering angle $\delta mi$ is calculated based on a gear ratio of the steering means 3 and the driving means 4. At step S173, a value resulting from the multiplication of a difference between a now deviation angle $\theta t$ of the motor 11 and the target deviation angle $\theta di$ by the previously determined gains Ko and $K_E$ is calculated as a command value of the motor torque. The presence of two calculation equations means that if the vehicle continuously travels along a lane in which the vehicle is now traveling, it is suitable to use a motor torque $T_0$ calculated in consideration of $K_0=K$ in the above equation. Conversely, if the vehicle travels along a target course within an adjacent lane, it is suitable to use a motor torque $T_E$ calculated in consideration of $K_E=K$.

The indication of step S173 by surrounding it by a dot line in FIG. 5 is to mean that the motor torque is calculated for the same purpose as at step S173 in a sixth embodiment which will be described hereinafter, and this calculation is a portion of the sixth embodiment corresponding to the calculation of the motor torque. The indication of step S173 by surrounding by a dot line in FIG. 5 is unneccessary for the first embodiment.

A value T resulting from the arithmetic addition, at step S174, of the motor torque command values $T_0$ and $T_E$ provided at the step S173 is determined as a motor torque. The determined value T is outputted to the motor amplifier 28 at step S175. It should be noted that at least one of the gains Ko and $K_E$ is "0", i.e., at least one of the motor torque command values $T_O$ and $T_E$ is "0" as defined at step S141.

After outputting of the determined value T to the motor amplifier 28, it is determined at step S176 whether the first timer Ct has reached "0". If the first timer Ct has not reached "0", the processing is returned to the START to carry out the same cycle. If the first timer Ct has reached "0", the flag Flag-L/C is set at "0" at step S177, and an operation for renewing the lane is carried out at step S178. In other words, an operation is conducted for changing the now-current lane after the lane change has occurred to register and renew such now-current lane as a lane on which the vehicle is now traveling. Thus, "0" is assigned to the new lane, and "E" is assigned to the adjacent lane. After this operation, the processing is returned to the original flow, where the same processes are repeated.

Figure 8:
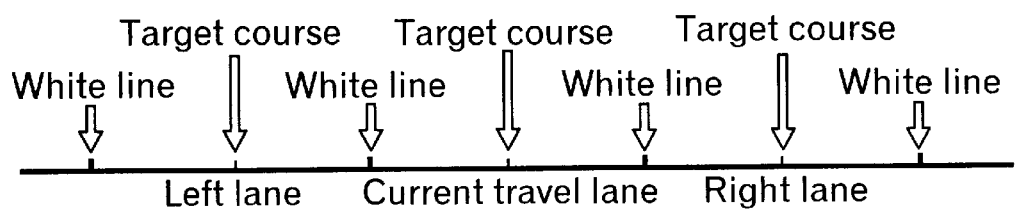
FIG. 8 is a sectional diagram of a road for complementing the explanation of the motion during changing of lane.

The operation of the first embodiment now will be described. Before the description of the operation, the structure of a road on which the vehicle is traveling will be described in brief with reference to FIG. 8. Three lanes are shown in FIG. 8, and it is supposed that the vehicle is now traveling on the central lane. A target course is established in each of the lanes by a technique which is disclosed in the prior patent application (Japanese Patent Application Laid-open No. 5-197423 U.S. Pat. No. 5,350,912). The target course may be established by another technique in addition to the technique disclosed in the prior patent application, or may be prepared in hardware road equipment. Magnetic force lines embedded in the ground are known as an examples of such a road equipment. However, the description will be made on the assumption that the target course is established by the technique disclosed in the prior patent application.

Figure 9:
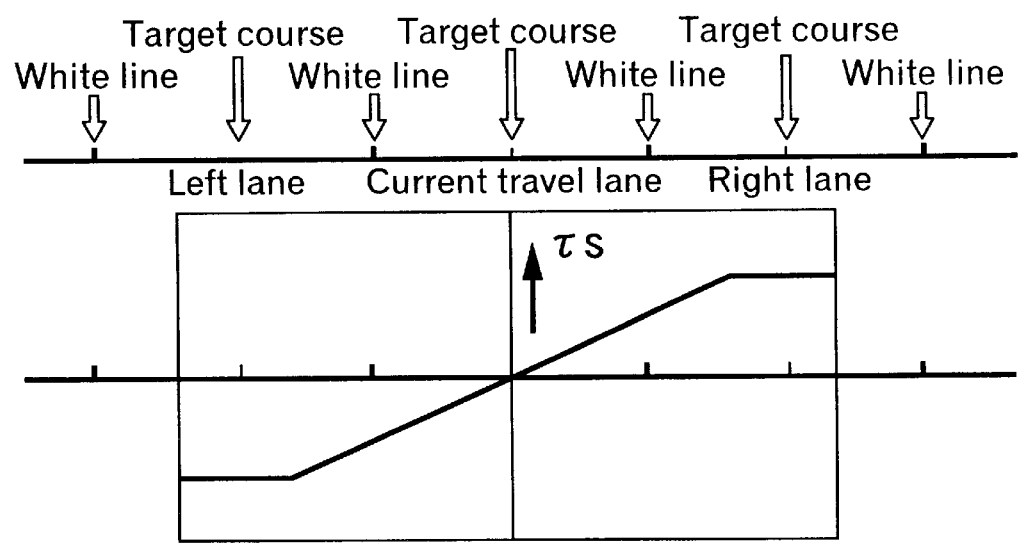
FIG. 9 is a diagram illustrating a distribution in steering force under a usual condition on the road in FIG. 8.

On a road shown in FIG. 8, the steering force τs before the lane change is determined in a manner shown in FIG. 9. More specifically, when the vehicle is traveling on the target course in a now travel lane, the steering force τs is "0", but if the vehicle departs from the target course, the steering force τs acts in a direction to allow the vehicle to be returned to the central target course in accordance with such deviation. At this time, the relationship between the steering force τs and the deviation from the course assumes a complicated curve by the geometry (a geometric configuration) of the traveling path of the vehicle, but is simplified and approximated to a straight line as shown in FIG. 9 for the purpose of easily understanding the description. The upper limit of the steering force τs is physically determined by the capacity of the motor 11 and hence, even if the vehicle is far away from the target course, the steering force τs is not increased to a predetermined value or more rather than being rectilinearly increased intact. Even when the motor 11 can afford an increase in steering force, the proportion of the increase in steering force τs can be decreased as the vehicle is farther and farther away from the target course, thereby relatively easily performing the lane change, as disclosed in another patent application (Japanese Patent Application Laid-open No. 8-21322) filed by the present applicant. However, these are not concerned directly with the present invention and hence, are not described herein. In any case, the steering force τs is a reference induction force which will be described hereinafter.

Figure 10:
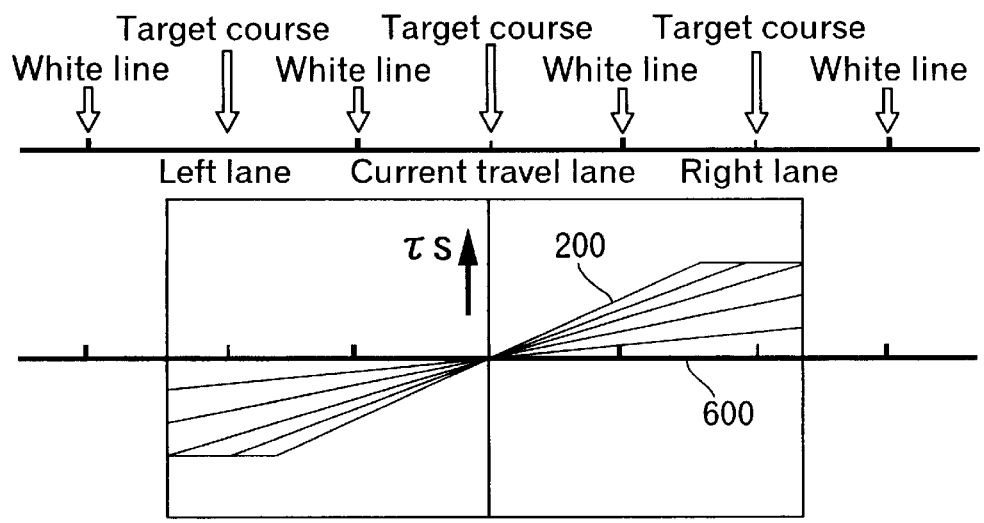
FIG. 10 is a diagram illustrating a variation in steering force on a reference target course after perceiving the lane change intention.

The reference induction force τs is varied as shown in FIG. 10 by the gain Ko defined at step S141 in the control algorithm shown in FIGS. 3 to 5. After completion of the counting of the second timer Cd, the reference induction force is continuously weakened as the counted value of the first timer Ct is decreased (as time is lapsed) and ultimately, the reference induction force vanishes. As a result of vanishing of the induction force, the driver can steer the vehicle by the same feeling as in a normal vehicle. During the vanishing, the induction force intensified by the steering for the lane change is weakened with the passage of time and hence, a natural feeling can be taken back.

Figure 11:
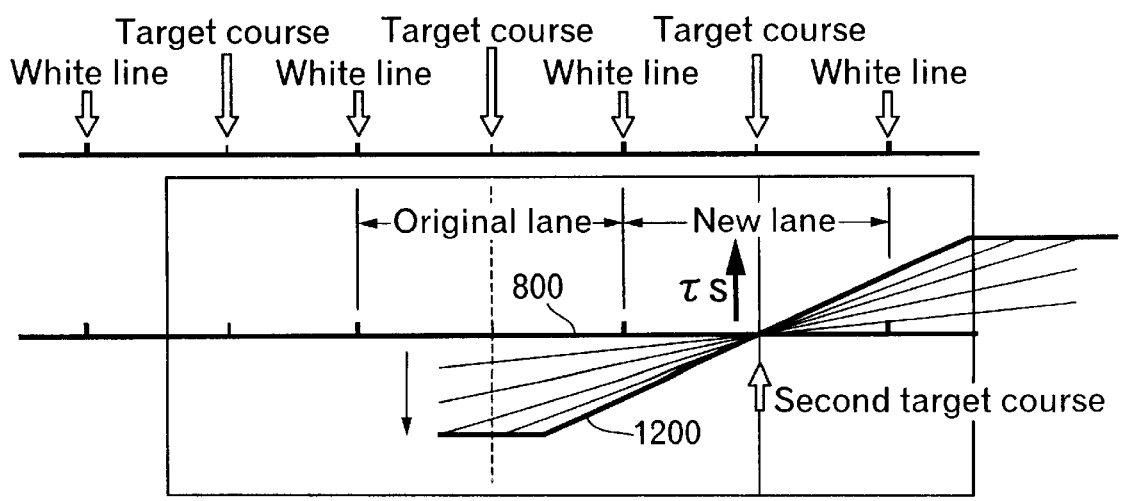
FIG. 11 is a diagram illustrating a variation in steering force on a second target course after perceiving the lane change intention.

Shown in FIG. 11 is a state in which the induction force is increased again, as the counted value of the first timer Ct is decreased (as the time is lapsed), when the vehicle has been moved, for example, to the right lane. In this case, the origin of the vehicle does not exist in the original lane (the reference lane) and is placed in a second target course on a second lane. Therefore, in this case, the steering force felt by the driver is directed to the second target course with time. If the vehicle is on the second target course, the induction force τs is equal to "0". The induction force is increased in proportion to the distance from the second target-course. This is a second induction force.

The steering force felt by the driver in the above manner is continuously switched over from a steering force for maintaining the original lane naturally to a steering force for maintaining the second lane before and after the lane change. Thus, it is possible to provide a natural lane change.

Even when the lane change is discontinued in the middle for any reason, the system perceives this to restore a reference induction force suitable for traveling of the vehicle along the original lane. Therefore, the driver can drive the vehicle to continuously travel on the original lane without the requirement of a troublesome operation.

The first embodiment has been described on the assumption that the lane change cannot be discontinued in any case after the flag Flag-L/C has once assumed "1". However, if it is desired to accommodate the situation of the discontinuation of the lane change even when the flag Flag-L/C is "1", the following modification may be made. Rather than a sudden advancement of the processing to step S145 after the answer of YES has been provided at step S130, the same determining process as at step S142 may be provided between steps S130 and S145, so that if the answer of the determination in the determining process in a step like step S142 is NO, the processing may be advanced to step S143 after returning of the flag Flag-L/C to "0".

Figure 12:
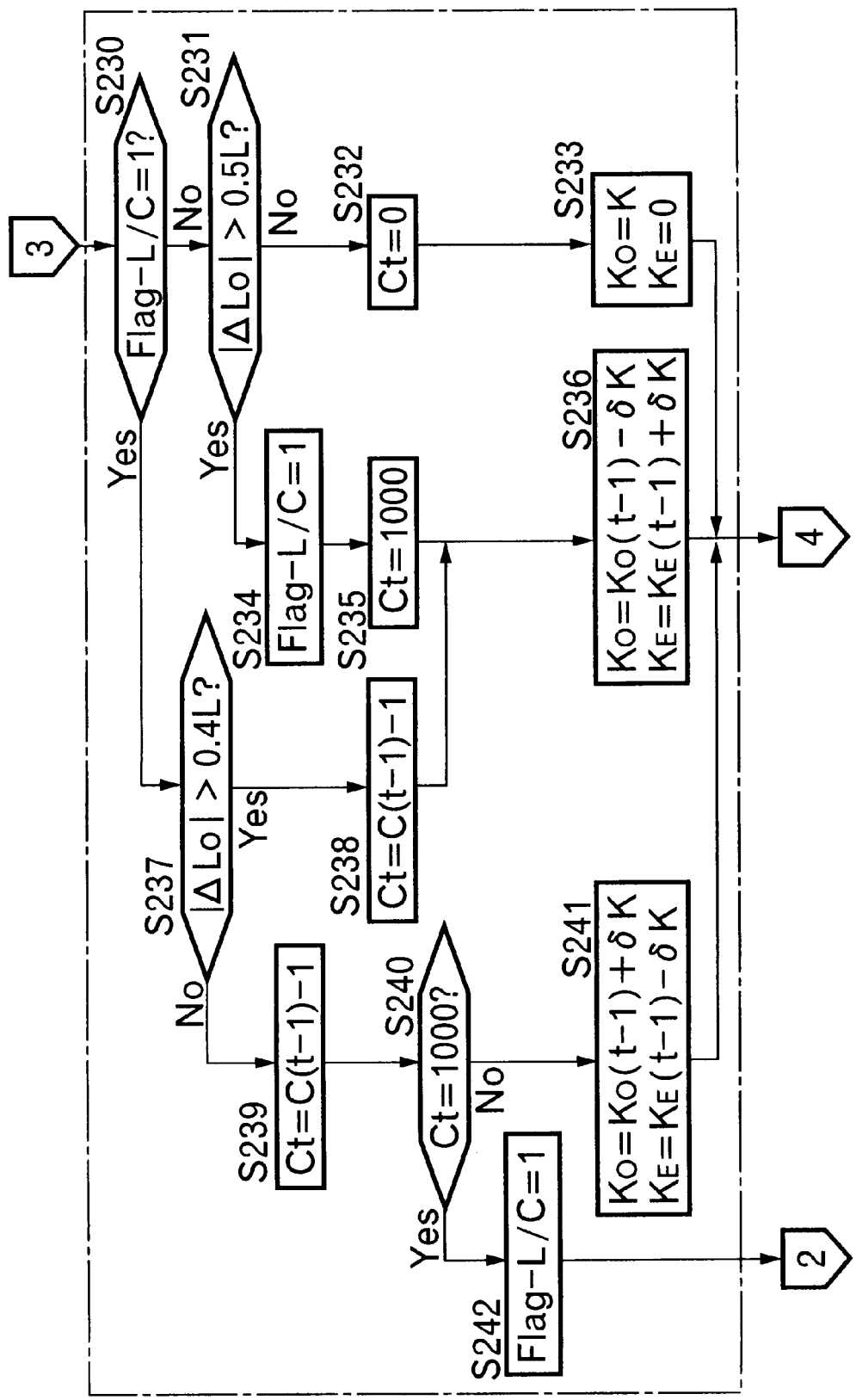
FIG. 12 is a flow chart illustrating an essential portion of a control algorithm in a second embodiment.
Figure 13:
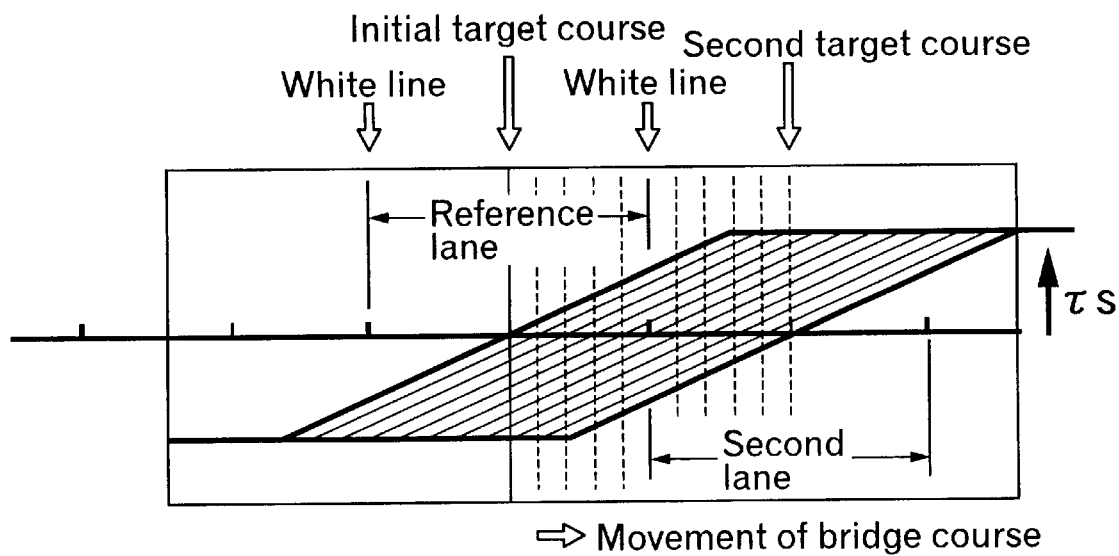
FIG. 13 is a diagram for explaining the situation of the displacement of the steering force on the road shown in FIG. 8.

FIGS. 12 and 13 illustrate a second embodiment of the present invention. FIG. 12 is a flow chart illustrating an essential portion of a control algorithm, and FIG. 13 is a diagram for explaining a situation of transfer of the steering force on a road shown in FIG. 8.

The control algorithm in the second embodiment is formed by replacing that portion of the control algorithm in the first embodiment which is shown in FIG. 4 (i.e., a portion surrounded by the one-dot dashed line) by a portion surrounded by a one-dot dashed line in FIG. 12. The other portions of the control algorithm are the same as in the first embodiment.

In FIG. 12, it is determined at step S230 whether the flag Flag-L/C is at "1". If the flag Flag-L/C is not at "1", it is determined at step S231 whether the deviation ΔLo from a target course on a lane where the vehicle is now traveling exceeds 50% of the lane width L. It is defined herein that 50% of the lane width L corresponds to a case where the vehicle is actually traveling on a white line. Even in this case, when $|\Delta Lo| \leq 0.5$ L, the timer Ct is set "0" at step S232 and then, the gain Ko is set at K, while the gain $K_E$ is set at "0" at step S233.

When it is determined at step S231 that the deviation ΔLo exceeds 50%, the processing is advanced to step S234 at which the flag Flag-L/C is set at "1" and then the timer Ct is set at "1,000" (5 seconds) at step S235. The gains Ko and $K_E$ for a period of decreasing of the counted value of the timer Ct are defined at step S236. More specifically, a value resulting from the subtraction of a vary small value δK from the last value of the gain Ko is newly defined as new Ko, and a value resulting from the addition of the vary small value δK to the last value of the gain $K_E$ is defined as new $K_E$. Namely, the decreasing of the gain Ko and the increasing of the gain $K_E$ are advanced in parallel to each other. Here, the vary small value δK is set so that the gain Ko just reaches "0" after a lapse of 5 seconds at which time the timer Ct is turned OFF, in other words, δK=0.001K. Reversely, the gain $K_E$ after 5 seconds is equal to K.

When the flag Flag-L/C is already at "1" at step S230, the processing is advanced to step S237, at which it is checked whether the current deviation ΔLo is smaller than a value of 40%, which is a second and smaller reference value. This is a check for confirming the fact that a discontinuation of the lane change might occur. If the current deviation ΔLo still exceeds 40%, an operation for decreasing the counted value of the timer Ct by "1" is carried out at step S238. Thus, if the flag Flag-L/C is "1" and the deviation ΔLo is not smaller than a second reference value (40%), the timer Ct is continued to be decreased toward "0". If the deviation ΔLo is smaller than the second reference value of 40% at step S237, the processing is advanced to step S239, at which an operation for increasing the timer Ct by 1 toward the originally set initial value of "1,000" is carried out. It is checked at step S240 whether the timer Ct has reached "1000". If the timer Ct is lower than "1000", the changes of the gains Ko and $K_E$ are reversed from those at previously described step S236. In other words, the gain Ko is increased by δK, and the gain $K_E$ is decreased by the same value δK, for every cycle in step S241. At the time point when the counted value of the timer Ct has reached "1,000", the processing is advanced from step S240 to step S242, at which the flag Flag-L/C is set at "0". Then, the processing is advanced to step S114 (see FIG. 5) described in the first embodiment, at which step the motor torque command value T is set at "0".

The processes at steps S233, S236 and S241 are the same as in the steps (see FIG. 5) at and after step S170 described in the first embodiment.

A difference in the second embodiment from the first embodiment is that the first reference value (50%) and the second reference value (40%) are set for the deviation ΔLo without the use of the timer for confirmation of the driver's lane change intention, and if the deviation ΔLo exceeds the first reference value, it is determined that the driver has a lane change intention, and if the deviation ΔLo is smaller than the second reference value, which is smaller than the first reference value, it is determined that the lane change has been discontinued. As a result, the time required for the determination can be saved, and the system has a more enhanced responsiveness than in the first embodiment.

In the changing of the two gains Ko and $K_E$, the gain of the second induction force is increased at the same rate simultaneously with the decreasing of the gain of the reference induction force. As a result, what occurs is that sums τs of the calculated values To and $T_E$ of the torque command values are inclined at the same angle and displaced in parallel from the reference lane toward the second lane as shown in FIG. 13. At the points at which the lines indicating the steering forces intersect the horizon, the induction force is "0" and hence, the driver feels as if the point at which the induction force is approximately "0" is displaced from the reference target course toward the second target course. During this displacement, the vehicle is also moved forwards and hence, the connection course, at which the induction force is approximately "0", must look like it is extending in a straight line laterally obliquely and forwards from the reference target course toward the second target course to become connected with the second target course. When the subject vehicle departs from the connection course, the induction force depending upon the distance from the connection course acts in a direction to allow the subject vehicle to be returned toward the connection course. Therefore, if the driver drives the vehicle while taking-in the steering force, the lane change can be performed through the connection course to the second target course after the flag Flag-L/C has once become "1", unlike the first embodiment. Thus, it is possible for the system to have a flexibility with a smaller discord between the system and the human being.

In the first embodiment, if the lane change has been discontinued, the induction force is returned directly to the original reference induction force. In the second embodiment, however, the connecting itself is reduced to the reference target course, so that the induction force is returned to the original reference induction force with the passage of time. Thus, since the reduction is performed with the passage of time, it is possible to continue the driving with a more natural feeling, even when the lane change has been discontinued in the above manner.

In the first and second embodiments, the lane change is not determined before the deviation ΔLo of the vehicle from the reference target course reaches a considerably large value and hence, during this time, the driver is likely to be returned toward the reference lane by a larger induction force. There upon a third embodiment in which such a disadvantage is improved will be described below with reference to FIG. 14.

Figure 14:
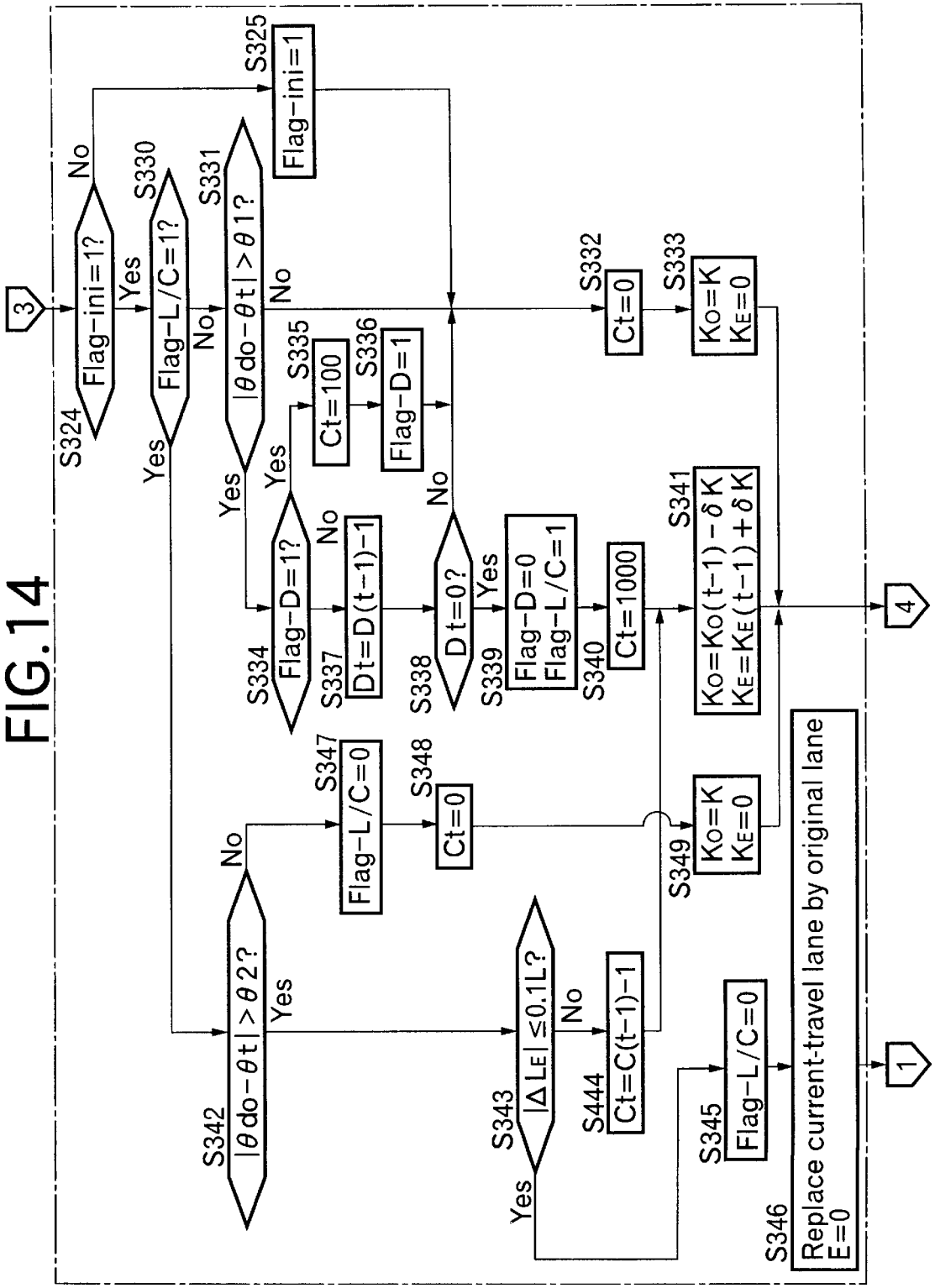
FIG. 14 is a flow chart illustrating an essential portion of a control algorithm in a third embodiment.

Even in the third embodiment, the portion surrounded by a one-dot dashed line in FIG. 14 has an interchangeability with the portion surrounded by the one-dot dashed line in FIG. 4 in the first embodiment. In the third embodiment, it is necessary to first calculate a deviation angle θdo of the motor 11 in order to use a difference between the deviation angle θdo of the motor 11 and the current steering angle θt suitable for traveling of the vehicle along the reference target course as a means for confirming the driver's lane change intention, and in only one cycle immediately after the SAS switch 21 (see FIGS. 1 and 2) has been pushed, the processing must be advanced to the lane following flow with no consideration of the lane change. To this end, it is determined at step S324 whether a flag Flag-ini is at "1". If the flag Flag-ini is not at "1" (if the current cycle is a first cycle), the processing is advanced to step S325, at which the flag Flag-ini is set at "1", and the processing advances to step S332 where the timer Ct is set to "0". Then, at step S333, the gain Ko of the reference induction force is set at "K", and the gain $K_E$ of the second induction force is set at "0", thereafter progressing to step S170 (see FIG. 5) described in the first embodiment. Only at this time point, the target deviation angle θdo of the motor suitable for traveling of the vehicle along the reference target course is calculated.

At and after the next time cycle, the flag Flag-ini is already at "1" at step S324 and hence, it is determined at step S330 whether the flag Flag-L/C is at "1". If the answer is NO at step S330, the processing is advanced to step S331, at which it is checked whether a difference between the deviation angle θdo of the motor suitable for traveling of the vehicle along the reference target course and the current steering angle θt is larger than a reference value θ1. Here, a numerical value calculated one cycle ago is used as the deviation angle θdo. To be exact, the deviation angle θdo is equal to θdo(t−1), but in order to avoid the troublesome reference numerals, the deviation angle θdo is represented merely by θdo. When this difference is large, a value different from a value determined in the system by the driver has been inputted and hence, it is construed that the driver has a lane change intention. When the difference is lower than the reference value θ1, it is construed that the driver has no lane change intention. When it is construed that the driver has no lane change intention, the processing is advanced to step S332, at which the timer Ct is set at "0". At step S333, the gain Ko of the reference induction force is set at "K", and the gain $K_E$ of the second induction force is set at "0", thereafter progressing to step S170 (see FIG. 5).

When it is determined YES at step S331 that the driver has the lane change intention, the processing is advanced to step S334, where it is determined whether the flag Flag-D is at "1" which it is not in the first cycle, and then the timer Dt for the determination is set at 100 (0.5 seconds) at step S335 in order to increase the degree of confidence of such intention. Namely, unless the state of YES at the step is continued at least for 0.5 seconds, it is not determined that the lane change is really performed. This is because even if the turning of the front wheel occurs casually due to the unevenness of a road surface and, as a result, the difference between the deviation angle θdo of the motor suitable for traveling of the vehicle along the reference target course and the current steering angle θt is increased, this phenomenon is transient and the lane change is not carried out. The duration of 0.5 seconds is used for confirming this. For this purpose, the processing is advanced to step S336, at which the flag Flag-D is set at "1", thereafter progressing to steps S332 and S333, at which the same gain as at the last time is provided. In the next cycle, the processing is advanced from step S334 to step S337, because the flag Flag-D has been set at "1".

At step S337, the value of the timer Dt is replaced by a "1"-subtracted value, and at next step S338, it is checked whether the timer Dt has reached "0". If the timer Dt does not reach "0", the processing is advanced to steps S332 and S333, at which the same gain as at the last time is selected. However, if the timer Dt has reached "0", it is determined that the driver's intention has been confirmed, progressing to step S339, at which the flag Flag-D is set at "0" and at the same time, the flag Flag-L/C is set at "1". Then, at step S340, the timer Ct is set at "1,000" for performing the bridging. Thereafter, the processing is advanced to step S341, at which the operation for decreasing the gain Ko of the reference induction force by δK and, at the same time, increasing the gain $K_E$ of the second induction force by δK is carried out as in the second embodiment.

After the flag Flag-L/C has been brought into "1" in this manner, the processing is advanced from step S330 to step S342, at which it is checked whether the difference between the deviation angle θdo of the motor suitable for traveling of the vehicle along the reference target course and the current steering angle θt is larger than a second reference value θ2. Even here, the deviation angle θdo must be θdo(t−1), but is represented only by θdo. The second reference value θ2 is defined as being a numerical value smaller than the reference value θ1. That is, it is checked whether the driver is continuously steering the steering wheel toward the second target course, or back to the reference target course.

If it is determined at step S342 that the driver is still steering the steering wheel toward the second target course, the processing is advanced to step S343, at which it is checked that the deviation $\Delta L_E$ of the subject vehicle from the second target course is equal to or smaller than a sufficiently small value of 0.1 L. Namely, it is checked whether the lane change has been completed. If the deviation $\Delta L_E$ of the subject vehicle from the second target course has not reached that the sufficiently small value of 0.1 L, the timer Ct is decreased by "1" at step S344, returning to step S341, at which the gains are further increased and decreased, respectively. However, it is determined at step S343 that the vehicle is closer to the second target course by a sufficient distance, the processing is advanced to step S345, at which the flag Flag-L/C is set at "0". Then, at step S346, the lane on which the vehicle is now traveling is replaced by the reference lane to replace "E" by "0", thereafter returning to the start in the flow chart.

It is determined at step S342 that the difference θt between the deviation angle θdo of the motor suitable for traveling of the vehicle along the reference target course and the current steering angle θt is smaller than the second reference value θ2, it is construed that the lane change has been discontinued, progressing to step S347, at which the flag Flag-L/C is set at "0". Then, at step S348, the timer Ct is brought to "0", and at step S349, the gain Ko of the reference induction force is set at "K", while the gain $K_E$ of the second induction force is set at "0", thereafter progressing to step S170 (see FIG. 5).

In the third embodiment, if the current steering angle shows a deviation equal to or larger than the reference angle from the steering angle optimized to achieve the continuous traveling along the reference target course, it is construed that the driver has the intention of the lane change and hence, it is possible to further enhance the responsiveness of the system, as compared with the first and second embodiments. This is because the steering angle is a first trigger for the lane change and corresponds to a differentiation term defined in the control. It is a common sense in this technical field that if the differential term is used for the trigger, the control with the phase correspondingly advanced can be achieved. In the third embodiment, a confirming period of 0.5 seconds is provided even after appearance of the deviation equal to or larger than the reference value, but of course, it is not an essential condition and may be omitted. In this case, if the reference value is set slightly large, no problem arises in practical use.

In the third embodiment, the system is arranged, so that the deviation of the current steering angle from the steering angle optimized to permit the continuous traveling of the vehicle along the reference target course is utilized even for the detection of the discontinuation of the lane change. Therefore, the system has a responsiveness enhanced for the same reason.

Moreover, the completion of the lane change is determined by the fact that the deviation of the subject vehicle from the second target course has been decreased to a small value and hence, the completion of the lane change can be reliably confirmed.

Whether or not the timer Ct has reached "0" upon the completion of the lane change, the renewing operation for re-perceiving the lane on which the vehicle is now traveling as the basic lane is conducted. Therefore, there is an effect that the driver can perceive an induction force along the new lane simultaneously with the completion of the lane change.

Figure 15:
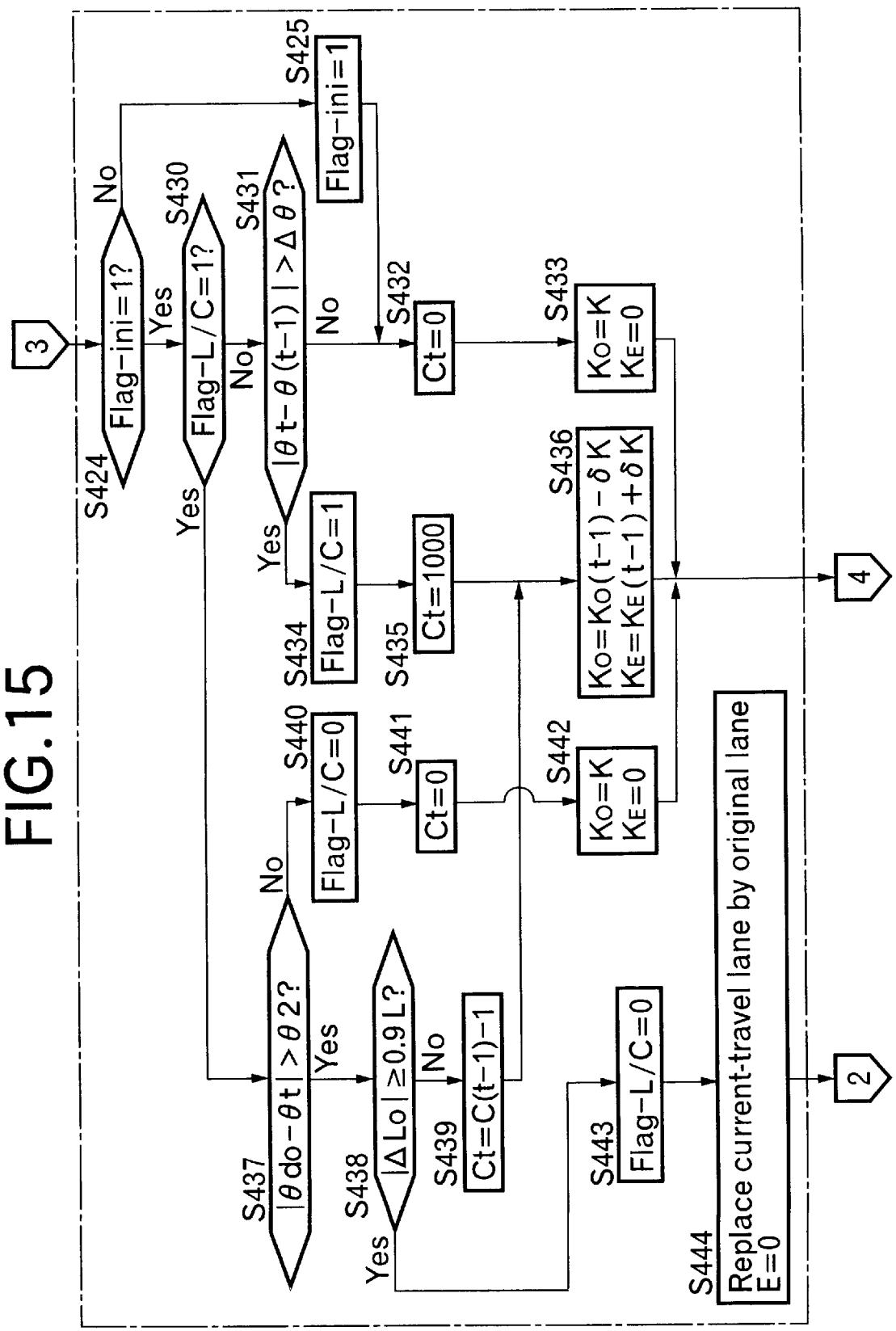
FIG. 15 is a flow chart illustrating an essential portion of a control algorithm in a fourth embodiment.

FIG. 15 illustrates a fourth embodiment. Even in the fourth embodiment, the portion surrounded by a one-dot dashed line in FIG. 15 has an interchangeability with the portion surrounded by the one-dot dashed line in FIG. 4.

The fourth embodiment is designed so that the steering angle speed further advanced in phase more than the steering angle is detected to further enhance the responsiveness of the system. Referring to FIG. 15, after passing of an initial routine for determining a steering angle θd at steps S424 and S425, it is checked at step S430 whether the flag Flag-L/C is already at "1". If the answer is NO, the processing is advanced to step S431, at which a difference between the current steering angle θt and the last steering angle θ(t−1) is determined, and it is checked whether this difference is larger than a preset steering change speed Δθ, i.e. the actual steering angle change for one cycle time of 5 msec. This difference {θt−θ(t−1)} has the same effect as one type of calculation from the fact that the flow is started for every given speed and hence, the speed may be considered with the difference. The steering operation includes two types of rightward and leftward steerages, which can be commonly dealt with, if compared by absolute values. If the answer at step S431 is NO, the processing is advanced to step S432 as in the third embodiment, at which the timer Ct is set "0". At step S433, the gains Ko and $K_E$ are defined, thereafter progressing to the next processing (at step S170 shown in FIG. 5).

If the answer at step S431 is YES, the flag Flag-L/C is set at "1" at step S434, and the timer Ct is set at 1,000 (5 seconds) at step S435. The gains are decreased and increased respectively at step S436.

If the answer at step S430 is YES, the processing is advanced to step S437, at which it is checked whether the current steering angle is larger than the smaller reference value θ2 with respect to the steering angle optimized to permit the continued traveling of the vehicle along the reference target course as in the third embodiment. If the answer of the checking is YES, the processing is advanced to step S438, at which it is checked whether the deviation ΔLo of the subject vehicle from the reference target course exceeds 90% of the lane width L. If the result of the checking shows that the deviation ΔLo still does not exceed 90%, the processing is advanced to step S439, at which the timer Ct is decreased by "1", thereafter returning to step S436.

It is determined at step S438 that the deviation ΔLo exceeds 90% of the lane width, it is perceived that the lane change has been completed, progressing to step S443, at which the flag Flag-L/C is set at "0". Then, an operation for renewing and registering, as a reference lane, the lane on which the vehicle is now traveling, is carried out at step S444.

If it is determined at previous step S437 that the current steering angle is equal to or smaller than the smaller second reference value θ2 with respect to the optimized steering angle, it is determined that the lane change has been discontinued, progressing to step S440, at which the flag Flag-L/C is set at "0". Then, at step S441, the timer Ct is brought to "0" and further, at step S442, the gains are redefined.

With the fourth embodiment, the confirmation of the lane change intention is performed based on the phase-advanced information in the form of the steering angle speed and hence, the system has a remarkably enhanced responsiveness. The determination criterion used at step S438 may be a deviation from the reference target course as information substituted for the deviation from the second target course described in the third embodiment.

Figure 16:
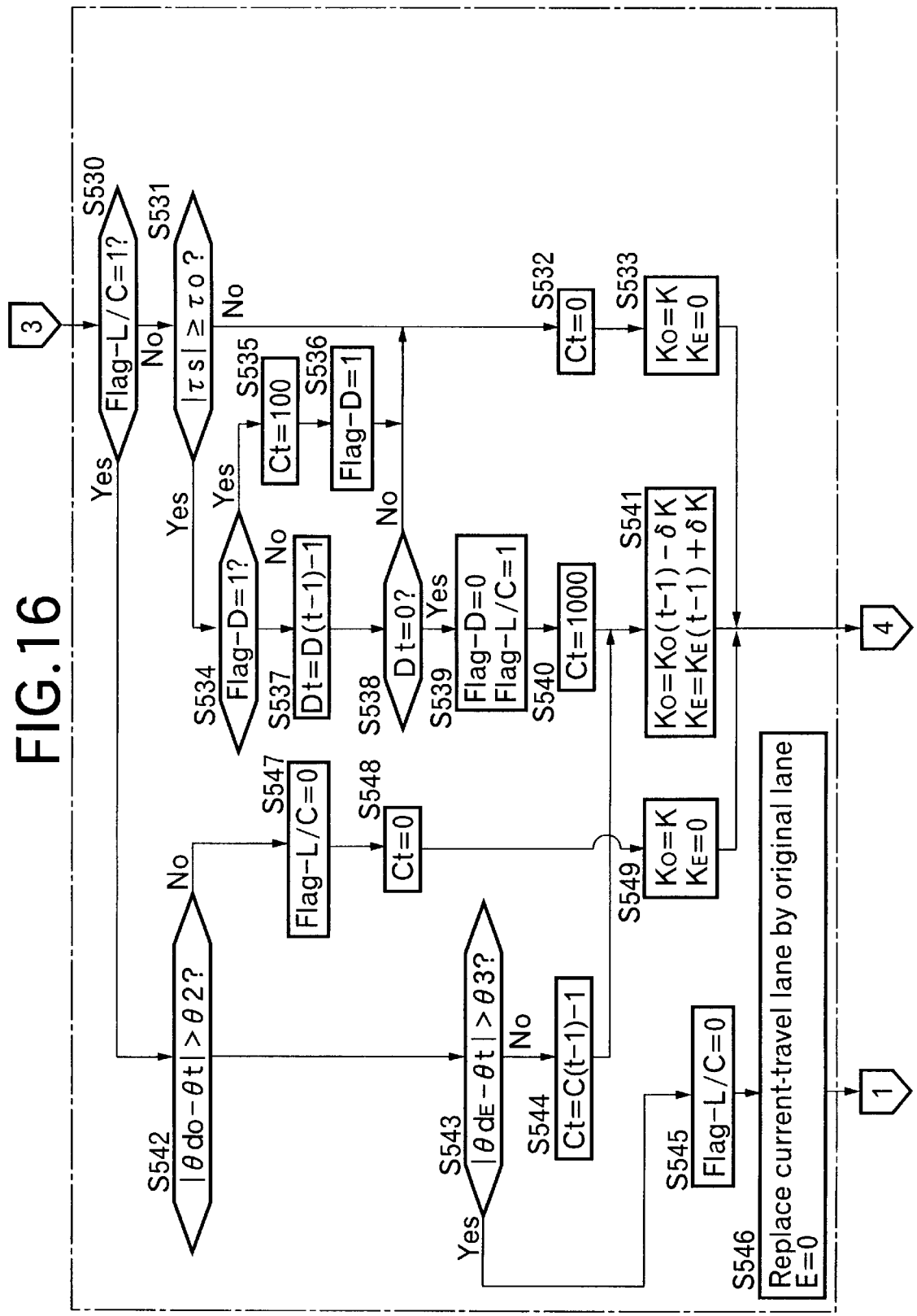
FIG. 16 is a flow chart illustrating an essential portion of a control algorithm in a fifth embodiment.

FIG. 16 illustrates a fifth embodiment of the present invention. Even in the fifth embodiment, the portion surrounded by a one-dot dashed line in FIG. 16 has an interchangeability with the portion surrounded by the one-dot dashed line in FIG. 4 in the first embodiment.

In the fifth embodiment, the lane change intention can be confirmed even by a steering force τs in place of the steering angle speed of the fourth embodiment. It is determined at step S531 whether the steering force τs exceeds a preset value τo. If the result is YES, it is construed that the driver has the lane change intention. In this embodiment, the arrangement is such that, rather than determining that the driver has the lane change intention immediately from the result at step S531, the intention is confirmed, only when the steering force exceeds the reference value continuously for a predetermined time (0.5 seconds) as in the third embodiment. The reason is that if the steering force has reached a considerable value and has been continued for a significant time, this confirms the fact that the driver has a strong lane change intention. Of course, it is not an essential condition of the present invention to defer the determination for the predetermined time, and if it is desired to enhance the responsiveness, this process can be omitted as in the third embodiment.

In the fifth embodiment, the completion of the lane change is confirmed by the fact that the deviation between the steering angle $θd_E$ optimized to continue the traveling of the second target course and the current steering angle θt is smaller than a very small angle reference value θ3 at step S543. The reason will be able to be easily understood from the contents described in the previous patent application (Japanese Patent Application Laid-open No. 5-197423 U.S. Pat. No. 5,350,912) filed by the present applicant.

With regard to other processings, steps S530, S532 to S542 and S544 to S549 are identical to steps S330, S332 to S342 and S344 to S349 in the third embodiment shown in FIG. 14, and hence, the description of them is omitted here.

In the fifth embodiment, the steering force τs that is capable of being directly measured is used as the determination criterion and therefore, there is an effect that the time required for the calculation can be saved, leading to a correspondingly decreased possibility of mistake. In carrying out the lane change, it is unnecessary to first determine a steering angle θdo optimized to permit the continued traveling of the vehicle along the reference lane. Therefore, steps corresponding to steps S324 and S325 required in the third embodiment can be omitted, leading to a simplified algorithm.

In the technique disclosed herein, when the value of the steering force has reached a considerable value and moreover, has been continued for a predetermined time, it is considered that the driver has the lane change intention. However, it will be easily understood that the present invention need not be limited to this, and if the reference value of the steering force is large, it is not necessary to wait to make the determination for a predetermined time, but rather it may be determined immediately that the driver has the lane change intention.

In the fourth and fifth embodiments, the responsiveness of the system has been considerably enhanced, and a technique for further enhancing the responsiveness and a technique for permitting the driver to easily perform the lane change will be described in a subsequent sixth embodiment.

Figure 17:
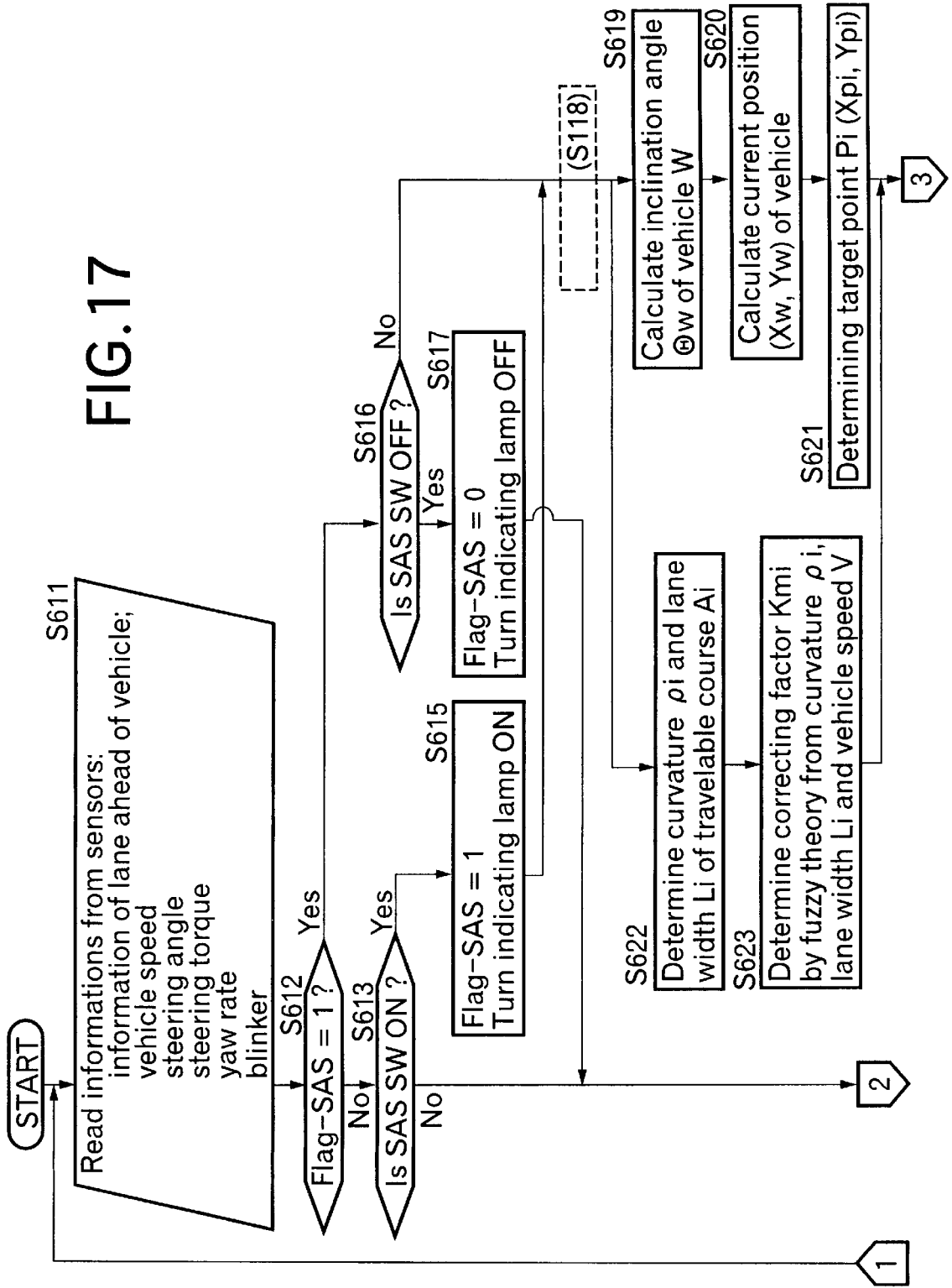
FIG. 17 is a flow chart similar to FIG. 3, but illustrating a control algorithm in a sixth embodiment.
Figure 18:
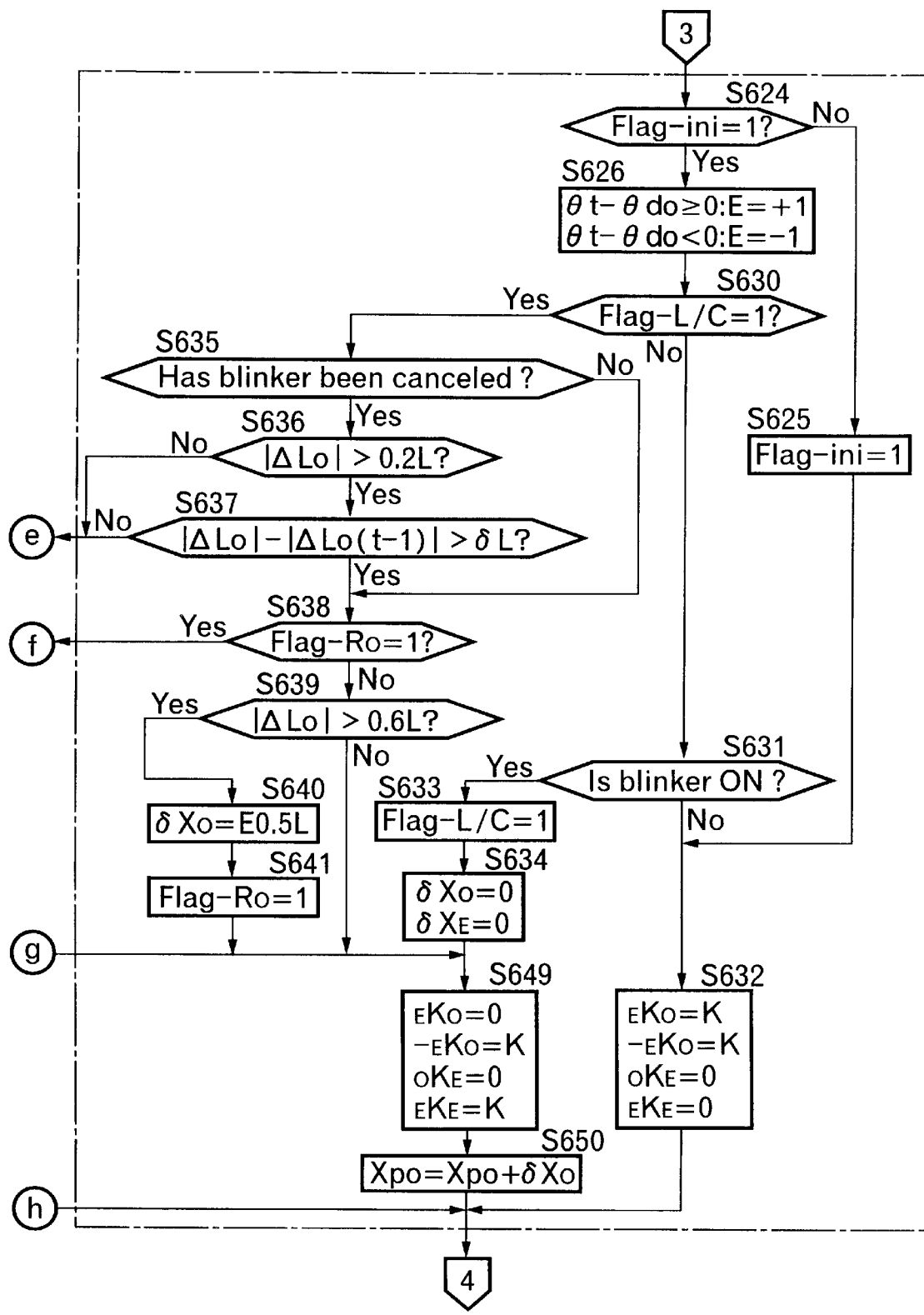
FIG. 18 is a flow chart similar to FIG. 4, but illustrating a portion of the control algorithm in the sixth embodiment.
Figure 19:
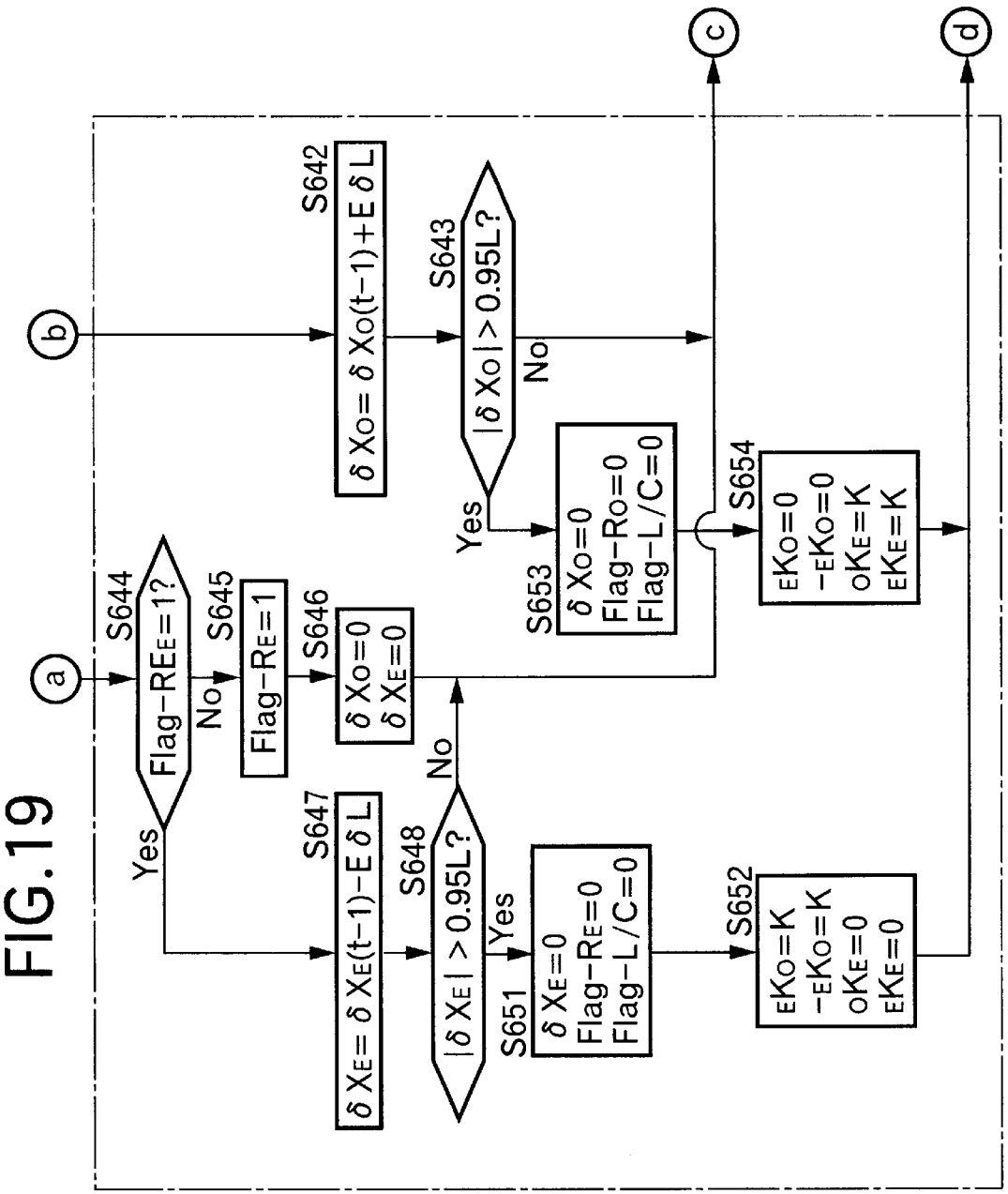
FIG. 19 is a flow chart similar to FIG. 4, but illustrating the remainder of the control algorithm in the sixth embodiment.

FIGS. 17 to 20 illustrate a sixth embodiment of the present invention. FIG. 17 is a flow chart illustrating a control algorithm corresponding to FIG. 3; FIG. 18 is a flow chart illustrating a portion of a control algorithm corresponding to the control algorithm shown in FIG. 4; FIG. 19 a flow chart illustrating the remainder of the control algorithm corresponding to the control algorithm shown in FIG. 4; and FIGS. 20A, 20B and 20C are diagrams each illustrating a variation in induction force with the passage of time.

Referring first to FIG. 17, steps S611 to S613 and S615 to S623 correspond to steps Sill to S113 and S115 to S123 shown in FIG. 3, except that the definition of the processing step for defining the constant E as at step S118 surrounded by a dashed line in FIG. 17 is changed for a reason which will be described hereinafter, and such processing is shifted to a subsequent step (step S626 in FIG. 18).

Referring to FIGS. 18 and 19, at step S624 subsequent to steps S621 and S623 in FIG. 17, it is checked whether a flag Flag-ini is "1". This flag Flag-ini is initially not "1" and hence, the processing is advanced to step S625, at which the flag Flag-ini is set at "1". Then, at step S632, various gains are defined, progressing to steps corresponding to step S170 and subsequent steps in the first embodiment (see FIG. 5), at which a target deviation angle θdo of the motor suitable for the traveling of the vehicle along the reference target course is calculated.

In the next cycle, the flag-ini is "1" and hence, the result at step S624 shows YES, thereby progressing to step S626. Here, the target deviation angle θdo of the motor calculated in the previous cycle is used. Namely, to be exact, the target deviation angle θdo at step S626 is θdo(t−1), but is represented only by θdo for the same reason as in the previous embodiment. The constant E is newly defined in this process. Specifically, if the current deviation angle θt of the motor is larger than the target deviation angle θdo, including the sign, the constant E is defined to be E=+1, and if the current deviation angle θt is smaller than the target deviation angle θdo, the constant E is defined to be E=−1. E="+1" indicates that the current motor deviation angle θt has a deviation in a clockwise direction with respect to the motor deviation angle θdo required for traveling of the vehicle along the reference target course. This represents a state in which the vehicle is intended to be advanced digressing rightwards from the reference target course. Reversely, E="−1" represents a state in which the vehicle is intended to be advanced digressing leftwards from the reference target course.

The reason why the constant E is defined purposely in a complicated manner is that the connection course for the lane change has a width, and no induction force is basically generated within a zone of the connection course and hence, the direction of steering provided by the driver cannot be simply specified by the steering force τs. For example, if it is supposed that the lane is changed rightwards on a road curved leftwards, the lane change can be achieved even if the steering wheel has been steered slightly leftwards (at this time, τs is minus). The direction of steering provided by the driver cannot be specified by the sign of the steering force τs. The reason why the process for defining the constant E has been shifted to this stage is that the constant E cannot be defined before the target deviation angle θdo of the motor is calculated.

At step S630 subsequent to step S626, it is checked whether the flag-L/C is at "1". If the flag-L/C is not at "1", the processing is advanced to step S631, at which it is checked whether the blinker is in operation. At this time, the direction of the blinker is read simultaneously. If the blinker is in a non-operated state, the processing is advanced to step S632, at which both the left and right gains $_EKo$ and $_{-E}Ko$ pertaining to the reference induction force are set at K and both the left and right gains $_OK_E$ and $_EK_E$ pertaining to the second induction force are set at 0, thereafter progressing to step S170 and subsequent steps (see FIG. 5) described in the first embodiment. The gains $_EKo$ and $_{-E}Ko$, $oK_E$ and $_EK_E$ will be described in brief. Although the single gain is assigned to each of the reference target course and the second target course in the first to fifth embodiments, the left and right gains are managed separately in each of the target courses and independent gains are assigned in the sixth embodiment. For example, the gains $_{+1}Ko$ and $_1Ko$ indicate the right and left gains in the reference target course. When the steering wheel is steered rightwards, this steering is by the gain $_{+1}Ko$. Likewise, with regard to the second target course, the gain on the side of the reference course is managed as $_OK_E$, and the gain on the opposite side is managed as $_EK_E$.

If the blinker is in operation at step S631, then the processing is advanced to step S633, at which the flag Flag-L/C is set at "1". At next step S634, the amounts δX$_O$ and δX$_E$ of movement of coordinates on the reference target course and the second target course are set at "0".

Thus, the flag Flag-L/C has become "1" and hence, during the next cycle time, the result at step S630 is changed to YES, and processing is advanced from step S630 to step S635. At step S635, it is checked whether the blinker has been canceled. If the blinker has been canceled, it is further checked at step S636 whether the deviation ΔLo of the subject vehicle from the current reference target course exceeds 20% of the lane width. If the deviation ΔLo exceeds 20% of the lane width, it is checked whether the variation in the deviation with the passage of time is being increased by an amount greater than δL at step S637. If the variation is being increased, the processing is advanced to step S638, at which it is determined if a flag Flag-Ro is at "1". The flag Flag-Ro will be described in brief.

When the connection is started to be reduced from the reference target course toward the second target course, the flag Flag-Ro is set at "1". Initially, the flag Flag-Ro is not "1" and hence, the processing is advanced from step S638 to step S639, at which it is checked whether the previous deviation ΔLo exceeds 60% of the lane width L. If the deviation ΔLo does not exceed 60%, the processing is advanced directly to step S649. If the deviation ΔLo exceeds 60%, an operation for laterally shifting the lateral abscissa δXo of the target point on the reference target course by 50% of the lane width L is carried out at step S640, whereby the direction thereof is matched with the direction of E.

The reason for the provision of step S637 will be further supplementary described below. It will be described how the blinker is used during traveling of the vehicle on a highway. Usually, the blinker is operated in carrying out the lane change, but even in the middle of the lane change, the blinker may be canceled in very many cases. This is because a large lane change can be performed on the highway even if the steering wheel is steered at a small steering angle and hence, a mechanism for automatically canceling the blinker is scarcely operated, and in general, the canceling is conducted manually. Namely, the canceling is carried out at driver's option by a driver's occasional judgment and for this reason, in the middle of the lane change, the canceling may be conducted in some cases. Therefore, the provision of step S637 ensures that even in such a case, if the deviation ΔLo from the reference target course is being increased by a significant amount δL, the control can be continued under the consideration of the fact that the lane change intention is subsequently maintained.

Returning again to FIG. 18, at step S641 subsequent to step S640, the flag Flag-Ro is set at "1", thereafter progressing to step S649. Thus, the flag Flag-Ro has become equal to 1 and hence, during the next cycle time, the result at step S638 is changed to YES, and the processing can be advanced to step S642 in FIG. 19.

At step S642, an operation for further displacing the offset amount δXo of the X ordinate of the target point on the reference target course by a very small amount from the last offset amount is carried out. The direction of this offset is matched with the direction of E. Then, the processing is advanced to step S643, at which it is checked that the accumulated amount of offset of the target point resulting from the displacement exceeds 95% of the lane width. If the accumulated amount of offset still does not exceed 95%, the processing is advanced to step S649 (FIG. 18) with such offset amount left as it is.

If the deviation ΔLo of the subject vehicle upon the canceling of the blinker is smaller than 20% of the lane width at previous step S636 (as shown in FIG. 18), it is considered that the lane change has been discontinued, progressing to step S644 in FIG. 19. At step S644, it is checked whether a flag Flag-$R_E$ is at "1". However, this is the first time and hence, Flag-$R_E$=0. The flag Flag-$R_E$ will be described here in brief. When the connection course is started to be reduced from the second target course toward the reference target course, Flag-$R_E$=1. In this stage, Flag-$R_E$=0 and hence, the processing is advanced from step S644 to step S645, at which the flag Flag-$R_E$ is set at "1". Then, at step S646, both of the amounts δXo and δ$X_E$ of offset of the X ordinates on the reference target course and the second target course are set at "0", thereafter progressing to step S649 (FIG. 18). During the next cycle time, the flag Flag-$R_E$ is at "1" and hence, the result at step S644 is changed to YES, thereby progressing from step S644 to step S647. At step S647, an operation for laterally displacing the amount of offset δ$X_E$ of the X ordinate of the target point on the second target course by δL from the last amount is carried out, and the direction of this displacement is opposite from the direction of E. At the next step S648, it is checked whether the accumulated amount of offset resulting from the displacement exceeds 95% of the lane width. If the accumulated amount of offset still does not exceed 95%, the processing is advanced to step S649 with the offset amount left as it is.

At step S649 (FIG. 18), for the left and right gains of the reference induction force, the gain $_EKo$ in the direction of E is defined as "0", and the gain $_{-E}Ko$ in the direction opposite from the direction of E is defined as "K". At the same time, for the left and right gains of the second induction force, the gain $_EK_E$ in the direction of E is defined as "K", and the gain $_{-O}K_E$ in the direction opposite from the direction of E is defined as "0". Then, the processing is advanced to step S650, at which an operation for adding the above-described offset amount δXo to the ordinate Xpo of the target point on the reference target course is carried out, thereafter progressing to steps corresponding to step S170 and subsequent steps (see FIG. 5) described in the first embodiment.

If the answer at step S648 is YES, it is considered that discontinuation of the lane change has occurred and that returning to the original lane has been completed, thereafter progressing to step S651, at which that ordinate of the target point on the second target course which has been displaced theretofore is returned to the second target course. At the same time, both of the flags Flag-$R_E$ and Flag-L/C are set at "0". Then, the processing is advanced to step S652, at which the left and right gains $_EKo$ and $_{-E}Ko$ of the reference induction force are returned to "K", and the gains $_EK_E$ and $_{-E}Ko$ of the second induction force are defined as "0". Substantially no problem can be caused by the fact that the ordinate of the target point on the second target course has been returned to the second target course by the operation at step S652, and thus, the vehicle can continue traveling along the reference target course.

If the answer at step S643 is YES, it is determined that the lane change has been actually completed, progressing to step S653. At step S653, that ordinate of the target point on the reference target course which has been displaced theretofore is returned to the original reference target course, and both of the flags Flag-Ro and Flag-L/C are set "0", thereafter progressing to step S654. At step S654, the left and right gains $_EKo$ and $_{-E}Ko$ of the reference induction force are defined as "0", and the gains $_EK_E$ and $_{-O}K_E$ of the second induction force are defined as "K". This operation causes the reference induction force to disappear, while establishing the left and right second induction forces.

In the sixth embodiment, the motor torques To and $T_E$ are calculated in the following calculating technique in place of the processing at step S173 in the control algorithm shown in FIG. 5 in the first embodiment.

$$E(\theta t - \theta do) \geq 0 : To = {}_EKo(\theta do - \theta t)$$

$$T_E = oK_E(\theta d_E - \theta t)$$

$$E(\theta t - \theta do) < 0 : To = {}_{-E}Ko(\theta do - \theta t)$$

$$T_E = {}_EK_E(\theta d_E - \theta t)$$

More specifically, when the value resulting from the multiplication of E times the difference between the current deviation angle θt of the motor and the target deviation angle θdo optimized to permit the traveling of the vehicle along the reference lane is positive, the gain $_EKo$ is used for calculation of the motor torque To, and the gain $oK_E$ is used for calculation of the motor torque $T_E$. In contrast, when the value resulting from the multiplication of E times the difference between the current deviation angle θt of the motor and the target deviation angle θdo optimized to permit the traveling of the vehicle along the reference lane is negative, the gain $_{-E}Ko$ is used for calculation of the motor torque To, and the gain $_EK_E$ is used for calculation of the motor torque $T_E$. When these calculating equations are used, the two induction forces are defined in the following manner:

When E=+1 (i.e., when the rightward lane change is to be conducted):

The right half of the reference induction force disappears, and only left half is effective; and Reversely, the right half of the second induction force is effective, and left half disappears.

When E=−1 (i.e., when the leftward lane change is to be conducted):

The left half of the reference induction force disappears, and only right half is effective; and Reversely, left half of the second induction force is effective, and right half disappears.

As a result, a connection course zone with an induction force of substantially "0" is produced between the reference target course and the second target course, and when the vehicle travels in this area, the driver cannot receive any induction force from the system. (This is true, but depending upon the steering angle, a road surface reaction force is of course produced from the alignment of the front wheels.)

Figure 20A:
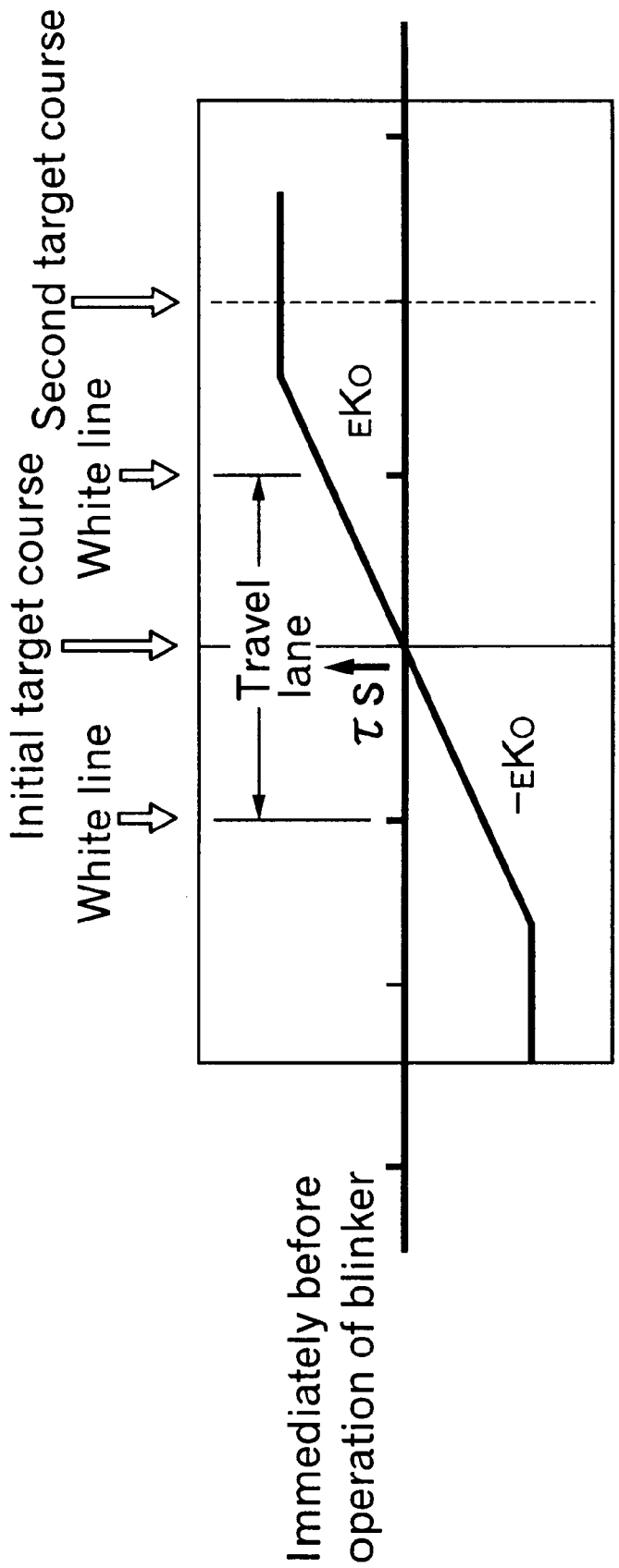
Figure 20B:
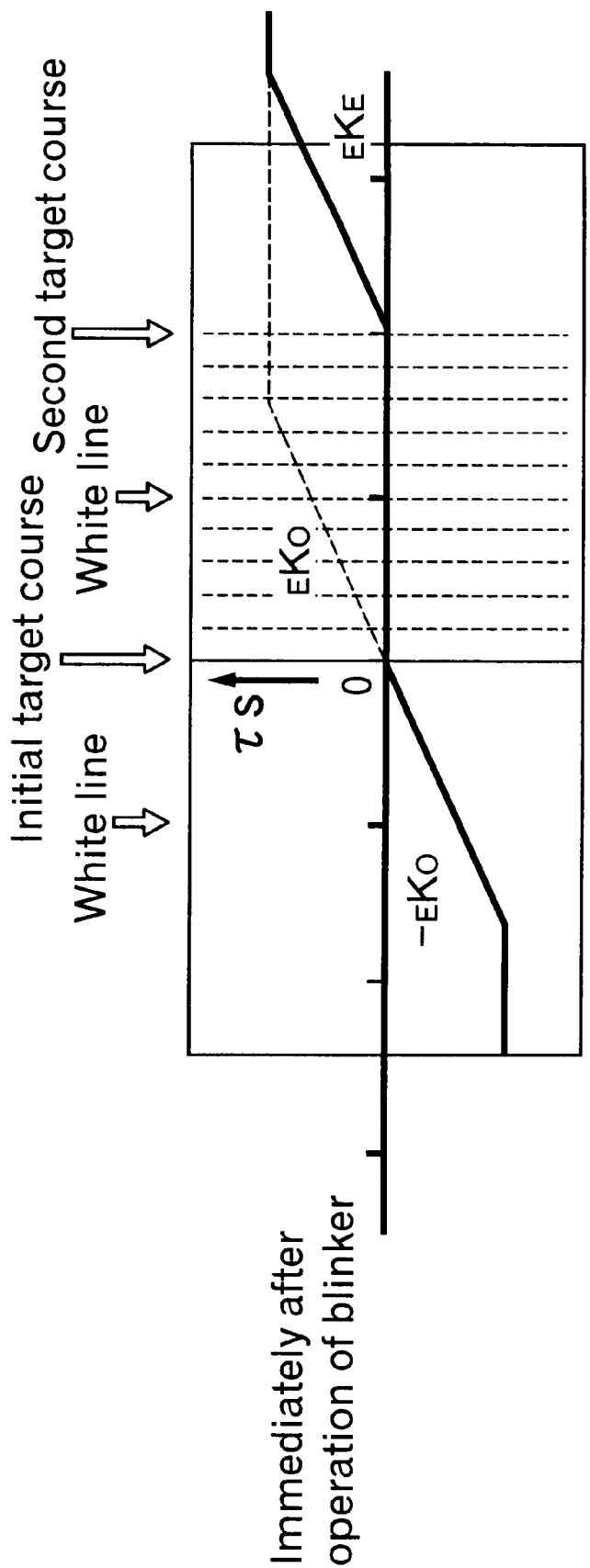

The reduction of the connection course is started by the reception of an output from step S637 for confirming that the lane change has been substantially carried out, and the situation of such reduction is shown in FIGS. 20A, 20B and 20C, illustrate the reduction upon the rightward steering. An induction force immediately before the blinker is operated is shown in FIG. 20A as being related to the initiator reference target course; an induction force immediately after the blinker has been operated is shown in FIG. 20B; and an induction force after the deviation ΔLo of the subject vehicle from the reference target course exceeds 60% is shown in FIG. 20C. As best shown in FIG. 20B, the right half $_EK_O$ of the reference induction force disappears immediately after the operation of the blinker, and in place of this, the right half $_EK_E$ of the second induction force is established. The driver feels this as if right half of the reference induction force has been displaced rightwards in a moment by the lane width L, and the area where the vehicle can be freely steered without action of the induction force is widened by the displaced mount corresponding to the lane width. As shown in FIG. 20C, when the deviation ΔLo of the subject vehicle from the reference target course exceeds 60%, the position of the subject vehicle is beyond a white line. Therefore, by displacing the ordinate of the target point on the reference target course rightwards to half of the lane width, the left half of the reference induction force $_{-E}K_O$ is first displaced rightwards by 0.5 L and then displaced rightwards by δL in each consecutive cycle. Finally, the condition at step S643 is satisfied to establish the perfect left and right second induction forces.

With such sixth embodiment, the connection course (zone) is widened from the reference target course in a moment by the operation of the blinker 40 and connected to the second target course. The operation of the blinker is a means for indicating the distinct lane change intention of the driver and hence, the responsiveness of the system is enhanced more than that in the technique disclosed in the first to fifth embodiment, so that the connecting is completed in a shorter time. This also provides an advantage that driver can easily perform the lane change substantially without experiencing opposition to the steering force.

The substantial completion of the lane change is confirmed by the fact that the deviation of the subject vehicle from the reference target course exceeds 60% of the lane width, and the connection course (zone) is reduced suddenly by half under the reception of the confirmation of the lane change at step S640 and thereafter, is reduced by a very small amount δL at step S642. As a result, the second induction force to be received by the driver is provided in a short time. Namely, it is desired to reduce the width of the connection course toward the second lane quickly, but if the entire width of the connection course is reduced roughly and quickly, the following disadvantage is encountered: the induction force is intensified at a higher speed than that of the driver's intended lane change, thereby forcing the connection course to approach the second target course. However, if the entire width of the connection course is reduced slowly, the following disadvantage is encountered: the induction force is far from the restoration, and a benefit of the system is not provided. However, the above-described control ensures that when there is no problem even if the entire width of the connection course is reduced quickly, the width of the connection course can be reduced quickly, and in a range in which a problem is expected, the width of the connection course can be reduced slowly. Thus, it is possible to provide an induction force for permitting the vehicle to immediately travel along the second target course after the lane change without causing the above-described disadvantage.

By the provision of step S637 at which it is determined whether the canceling of the blinker results from the discontinuation of the lane change or the driver has canceled the blinker early, notwithstanding that the lane change is being continued, the system becomes more intellectual and has a remarkably enhanced convenience in practical use.

Further, even when the lane change has been discontinued, the connection course is reduced from the second target course toward the reference target course with the passage of time. Even when the lane change has been discontinued by this technique, the reference induction force for permitting the vehicle to travel along the reference target course is gradually narrowed and intensified. When the width of the connection course is actually matched with the original reference target course, the original reference induction force is restored by each of steps S648, S651 and S652. As a result, the driver feels as if the steering force which is initially free is gradually drawn to a desired target course, and a benefit of the reference induction force can be smoothly received again. In such case, the speed of the reduction is constant. This is because when the lane change is discontinued, the reduction is generally carried out in a state in which the deviation from the position of the subject vehicle to the reference target course is not very large and hence, it is unnecessary to positively change the speed of the reduction. Of course, the arrangement may be such that the speed is changed at two or multiple stages.

In addition to the connection course reduction of the sixth embodiment, the reduction of the connection course may be conducted initially rapidly and then slowly, and a seventh embodiment is provided for the purpose of illustrating this fact.

Figure 21:
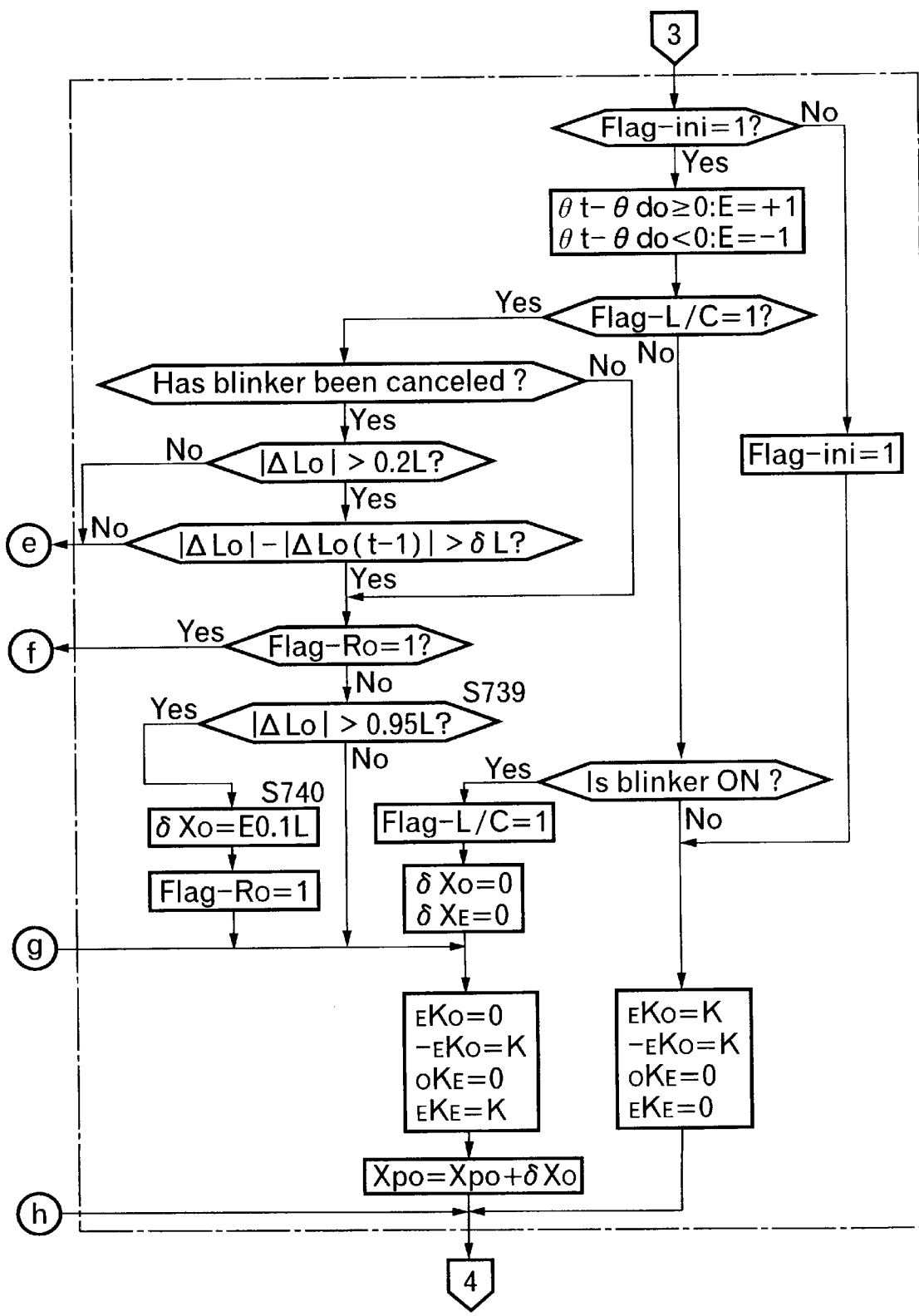
FIG. 21 is a flow chart similar to FIG. 4, but illustrating a portion of a control algorithm in a seventh embodiment.
Figure 22:
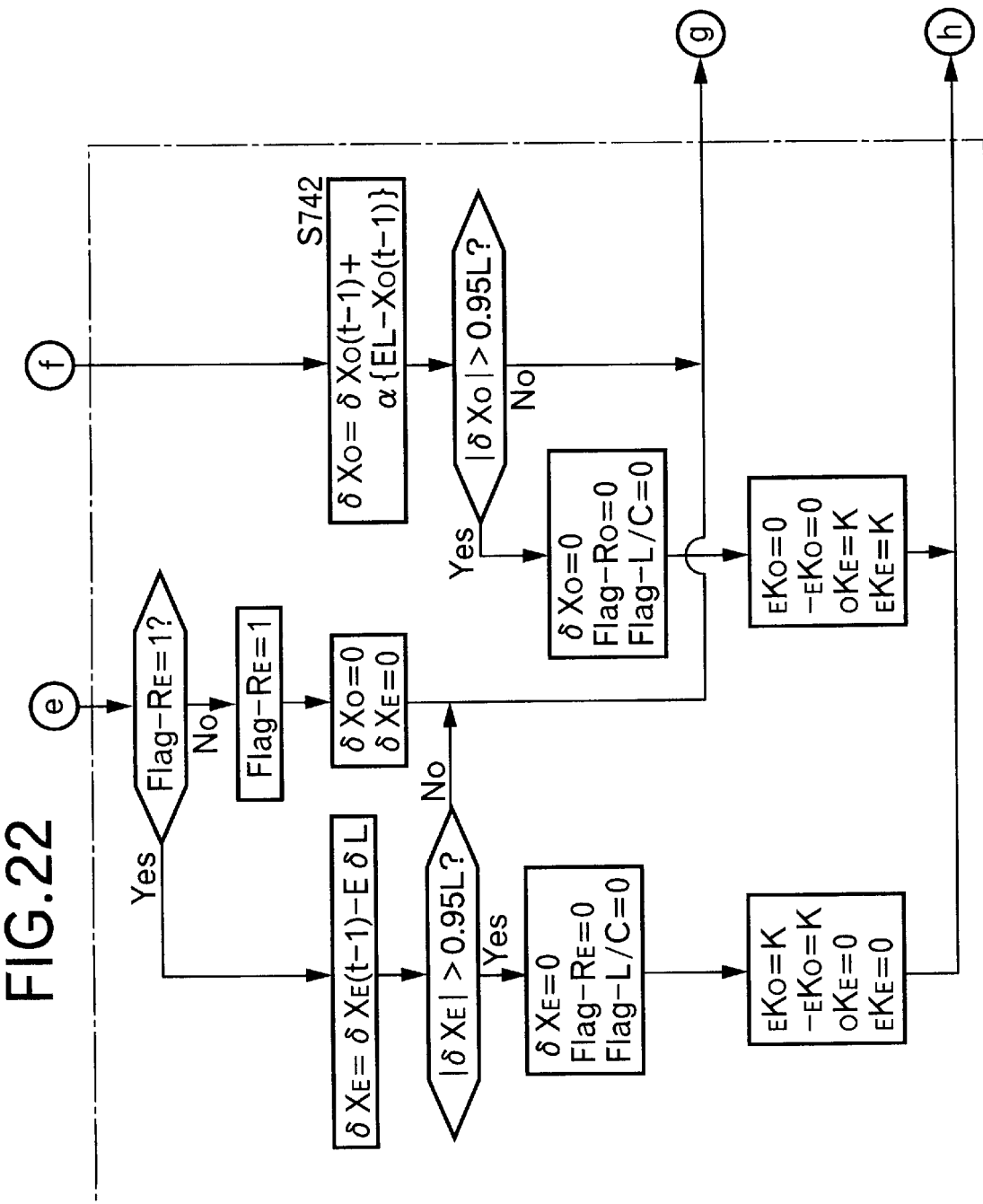
FIG. 22 is a flow chart similar to FIG. 4, but illustrating the remainder of the control algorithm in a seventh embodiment.

FIGS. 21 and 22 illustrate the seventh embodiment of the present invention. FIG. 21 is a flow chart illustrating a portion of a control algorithm corresponding to the control algorithm shown in FIG. 4 and FIG. 22 is a flow chart illustrating the remainder of the control algorithm corresponding to the control algorithm shown in FIG. 4.

Most of each of the flow charts shown in FIGS. 21 and 22 is the same as in the sixth embodiment shown in FIGS. 18 and 19. Therefore, for simplification of the description, it will be understood that only different portions are designated by step numbers in FIGS. 21 and 22 that are different than step numbers in FIGS. 18 and 19, and steps having no step number are the same as in the sixth embodiment.

At step S739 substituted for step S639 in the sixth embodiment, it is determined whether the deviation ΔLo between the position of the subject vehicle and the reference target course exceeds 95% of the lane width. Only when the deviation ΔLo exceeds 95%, the reduction is conducted. Namely, the timing of the reduction is not limited to that described for in the sixth embodiment, and an equivalent effect can be provided, even if the arrangement is such that when the lane change has been completed, the reduction is conducted by detecting the completion of the lane change.

It is the technique in the sixth embodiment to reduce the width of the connection course initially in a predetermined large amount and thereafter little by little, but it is proposed in the seventh embodiment to conduct the reduction at a speed describing an exponential curve. More specifically, at step S740, the width of the connection course is first reduced by 10% of the lane width L and then, the remainder of the width of the connection course is reduced at a predetermined rate (which is represented by α in the disclosed technique) at step S742 in FIG. 22. This operation causes the width of the connection course to be reduced, wherein the reduction is continued by α of the remaining width at all times and ultimately, the width disappears substantially. The speed of the reduction is gradually decreased as the connection width is reduced. Mathematically, the speed shows a exponential characteristic. Herein, α is illustrated by an example in which it can be initially set at a value different from 10%. However, if α is set at 0.1, the reduction is performed in an exponential characteristic with the rate constant from the beginning.

According to the seventh embodiment, it is possible to freely set the timing of starting the reduction, even when the lane change has been confirmed, and even when the completion of the lane change has been confirmed. Moreover, it is possible to set the timing of the confirmation at any timing only by replacing a predetermined value.

It is made clear that the speed of the reduction can be freely set in the seventh embodiment. A desired reducing mode can be realized only by changing the numerical expression.

As discussed above, by this invention it is possible to the steering assist system in the vehicle having an excellent man-machine interface built therein, thereby enabling the automatic traveling of the vehicle along the reference lane and the automatic traveling of the vehicle along the second lane, and easily achieving the lane change along the connection course with the force applied from the driving means to the steering means being substantially "0", by intervention of the driver.

Further, by this invention it also is possible to enable the automatic traveling of the vehicle along the reference lane and the automatic traveling of the vehicle along the second lane, to easily achieve the lane change along the connection course with the force applied from the driving means to the steering means being substantially "0", by intervention of the driver, and to appropriately accommodate the next-lane following control by the variation in connection course according to the degree of the advance of the lane change.

Still further, it is possible to enable the automatic traveling of the vehicle along the reference lane and to easily achieve the lane change by the intervention of the driver by weakening at least one of either the reference induction force or the second induction force. Moreover, it is possible to appropriately accommodate the next-lane following control by the variation in the connection course according to the degree of the advance of the lane change.

Further features of the invention include that the vehicle may be naturally shifted to the automatic traveling along the second lane upon the completion of the lane change, and to be naturally shifted to the steering along the original reference lane when the lane change is not executed. Also, the connection course (zone) can be formed for reasonably conducting the lane change from the reference lane to the second lane. The driver can be provided with steering angle information suitable for conducting the lane change along the connection course from the reference lane to the second lane. It is possible for the driver to easily conduct the lane change operation without experiencing the opposition of the steering force by widening or developing the connection course (zone) toward the second target course (zone) in response to the perceiving the driver's lane change intention and to change the width of the connection course (zone) in accordance with the degree of the advance of the lane change to smoothly shift the lane change to the automatic steering.

Although the embodiments of the present invention have been described in detail, it will be understood that the present invention is not limited to the above-described embodiments, and various modifications in design may be made without departing from the spirit and scope of the invention defined in the claims.

For example, in the first to seventh embodiments, the technique based on the Japanese Patent Application Laid-open No. 5-197423 U.S. Pat. No. 5,350,912 previously filed by the present applicant has been disclosed as the technique for realizing the traveling of the vehicle along the lane, but it is not required that the present invention be limited to this technique, and it is evident that the traveling of the vehicle along the lane may be achieved, for example, by the technique in the Japanese Patent Application Laid-open No. 6-255514 cited above as prior art. When the latter technique is used, a technique for moving the bank toward the other lane, in addition to a technique for decreasing or eliminating the height of the bank made in the potential process at the lane change, will be easily effected from the technique disclosed herein.

What is claimed is:

1. A steering assist system in a vehicle having a lane change function during forward traveling of the vehicle, comprising a steering means connected to a steered wheel and also connected to a steering wheel to be able to transmit a torque from said steering wheel, a driving means for operating said steering means, and a control unit having, means for detecting a reference lane on which the vehicle is now traveling forward, based on information of a road ahead of the vehicle to substantially set a reference target course within said reference lane, and applying, to said steering means, a reference induction force determined in accordance with the magnitude and direction of a deviation of the subject vehicle from said reference target course, thereby controlling the operation of said driving means to realize the forward traveling of the vehicle along said reference lane, wherein said control unit includes a means for substantially setting a second target course in a second lane along which the vehicle will be traveling forward after the lane change, a means for determining a second induction force to be applied to said steering means in order to realize the forward traveling of the vehicle along said second lane, in accordance with the magnitude and direction of the deviation of the subject vehicle from said second target course, and a means for connecting said reference target course and said second target course by a connection course with a force applied from said driving means to said steering, means during the lane change being substantially equal to "0".

2. A steering assist system in a vehicle having a lane change function during forward traveling of the vehicle, comprising a steering means connected to a steered wheel and also connected to a steering wheel to be able to transmit a torque from said steering wheel, a driving means for operating said steering means, and a control unit having means for detecting a reference lane on which the vehicle is now traveling forward, based on an information of a road ahead of the vehicle to substantially set a reference target course within said reference lane, and applying, to said steering means, a reference induction force determined in accordance with the magnitude and direction of a deviation of the subject vehicle from said reference target course, thereby controlling the operation of said driving means to realize the forward traveling of the vehicle along said reference lane, wherein said control unit includes a lane change confirming means for confirming the substantial execution, non-execution and completion of the lane change while the vehicle is traveling forward, a means for substantially setting a second target course in a second lane along which the vehicle will be traveling forward after the lane change, a means for determining a second induction force to be applied to said steering means in order to realize the forward traveling of the vehicle along said second lane, in accordance with the magnitude and direction of the deviation of the subject vehicle from said second target course, and a means for connecting said reference target course and said second target course by a connection course with a force applied from said driving means to said steering means during the lane change being substantially equal to "0" and for changing said connection course in accordance with the result of the confirmation by said lane change confirming means.

3. A steering assist system in a vehicle having a lane change function during forward traveling of the vehicle, comprising a steering means connected to a steered wheel and also connected to a steering wheel to be able to transmit a torque from said steering wheel, a driving means for operating said steering means, and a control unit having means for detecting at least a reference lane on which the vehicle is now traveling forward, based on an information of a road ahead of the vehicle to substantially set a reference target course within said reference lane, and applying, to said steering means, a reference induction force determined in accordance with the magnitude and direction of a deviation of the subject vehicle from said reference target course, thereby controlling the operation of said driving means to realize the forward traveling of the vehicle along said reference lane, wherein said control unit includes a means for substantially setting a second target course in a second lane along which the vehicle will be traveling forward after the lane change, a means for determining a second induction force to be applied to said steering means in order to realize the forward traveling of the vehicle along said second lane, in accordance with the magnitude and direction of the deviation of the subject vehicle from said second target course, and a means for weakening at least one of said reference induction force and said second induction force on said second lane during the lane change.

4. A steering assist system in a vehicle having a lane change function during forward traveling of the vehicle, comprising a steering means connected to a steered wheel and also connected to a steering wheel to be able to transmit a torque from said steering wheel, a driving means for operating said steering means, and a control unit having means for detecting at least a reference lane on which the vehicle is now traveling forward, based on an information of a road ahead of the vehicle to substantially set a reference target course within said reference lane, and applying, to said steering means, a reference induction force determined in accordance with the magnitude and direction of a deviation of the subject vehicle from said reference target course, thereby controlling the operation of said driving means to realize the forward traveling of the vehicle along said reference lane, wherein said control unit includes a lane change confirming means for confirming the substantial execution, non-execution and completion of the lane change, while the vehicle is traveling forward a means for substantially setting a second target course in a second lane along which the vehicle will be traveling forward after the lane change, a means for determining a second induction force to be applied to said steering means in order to realize the forward traveling of the vehicle along said second lane, in accordance with the magnitude and direction of the deviation of the subject vehicle from said second target course, and a means for weakening at least one of said reference induction force and said second induction force on said second lane during the lane change and for changing the situation of said weakening of the induction force in accordance with the result of said confirmation provided by said lane change confirming means.

5. A steering assist system in a vehicle according to claim 1 or 2, wherein said control unit includes an intention perceiving means for perceiving a driver's lane change intention, and is arranged to establish said connection course in response to an output from said intention perceiving means.

6. A steering assist system in a vehicle according to claim 2, wherein said control unit is arranged to eliminate said connection course in response to the confirmation of the substantial completion and non-execution of the lane change by said lane change confirming means.

7. A steering assist system in a vehicle according to claim 3 or 4, wherein said control unit includes an intention perceiving means for perceiving a driver's lane change intention, and is arranged to start the weakening of at least one of said reference induction force and said second induction force on said second lane in response to an output from said intention perceiving means.

8. A steering assist system in a vehicle according to claim 4, wherein said control unit is arranged to restore the reference induction force or the second induction force weakened once in response to the confirmation of the substantial completion and non-execution of the lane change by said lane change confirming means.

9. A steering assist system in a vehicle according to claim 1 or 2, wherein said connection course is comprised of a line having a predetermined width.

10. A steering assist system in a vehicle according to claim 1 or 2, wherein said connection course is established on the side of said second lane from said reference target course or on the side of said reference lane from said second target course.

11. A steering assist system in a vehicle according to claim 1 or 2, wherein the width of said connection course is determined so that it is narrowed with the advance of the lane change.

12. A steering assist system in a vehicle according to claim 1 or 2, wherein said control unit is arranged to apply an induction force for guiding the subject vehicle deviated from said connection course to said steering means in accordance with the distance from said connection course to the position of the subject vehicle.

13. A steering assist system in a vehicle according to claim 5, wherein said control unit is arranged to widen said connection course from the side of said reference target course toward the second target course simultaneously with the perceiving of the driver's lane change intention by said intention perceiving means or after a lapse of a predetermined time from said perceiving of the driver's lane change intention.

14. A steering assist system in a vehicle according to claim 5, wherein said control unit is arranged to expand said connection course from the side of said reference target course toward the second target course at a predetermined speed in response to the perceiving of the driver's lane change intention by said intention perceiving means.

15. A steering assist system in a vehicle according to claim 2, wherein said control unit is arranged to reduce the width of said connection course toward said second target course in response to the confirmation of the substantial execution or completion of the lane change by said lane change confirming means.

16. A steering assist system for a vehicle according to claim 2, wherein said control unit is arranged to reduce the width of said connection course toward said reference target course in response to the confirmation of the substantial execution or completion of the lane change by said lane change confirming means.

17. A steering assist system in a vehicle according to claim 15 or 16, wherein said control unit is arranged to reduce the width of said connection course at a constant speed or at predetermined speeds varied at a plurality of stages.

18. A steering assist system in a vehicle according to any of claims 1 to 4, wherein said control unit is arranged to change the extent of the relation between the deviation of the subject vehicle from said reference target course and the reference induction force, when the reference induction force is weakened during the lane change.

19. A steering assist system in a vehicle according to any of claims 1 to 4, wherein said control unit is arranged to determine a reference induction force related to a predetermined extent of relation in an area in which the deviation of the subject vehicle from said reference target course (zone) exceeds a reference value and to increase said reference value when the reference induction force is weakened during the lane change.

20. A steering assist system in a vehicle according to claim 2 or 4, wherein said control unit is arranged to increase the second induction force on said reference lane in response to the confirmation of the substantial execution or completion of the lane change by said lane change confirming means.

21. A steering assist system in a vehicle according to 1 or 2, wherein said control unit is arranged to increase said second induction force at least on said reference lane after a lapse of a predetermined time from the establishment of said connection course.

22. A steering assist system in a vehicle according to claim 7, wherein said control unit is arranged to decrease said reference induction force at least on said second lane and to increase said second induction force at least on said reference lane in response to the perceiving of the driver's lane change intention by said intention perceiving means.

23. A steering assist system in a vehicle according to claim 2 or 4, wherein said control unit includes an intention perceiving means for perceiving a driver's lane change intention, and is arranged to decrease said reference induction force at least on said second lane in response to the perceiving of the driver's lane change intention by said intention perceiving means, and to increase said second induction force at least on said reference lane in response to the confirmation of the substantial execution or completion of the lane change by said lane change confirming means.

24. A steering assist system in a vehicle according to claim 8, wherein said control unit is arranged to strengthen the extent of the relation between the deviation of the subject vehicle from said reference target course and the reference induction force, when the reference induction force is restored to an initial value.

25. A steering assist system in a vehicle according to claim 8, wherein said control unit is arranged to determine a reference induction force related to the deviation of the subject vehicle from said reference target course in a predetermined extent of relation in an area in which said deviation of the subject vehicle exceeds a reference value, and to decrease said reference value, when the reference induction force is restored to an initial value.

26. A steering assist system in a vehicle according to claim 23, wherein said control unit is arranged to carry out the decreasing of said reference induction force and the increasing of said second induction force according to a predetermined time schedule.

27. A steering assist system in a vehicle according to claim 2 or 4, wherein said control unit is arranged to replace said second lane by the reference lane, or replace said second target course by said reference target course in response to the confirmation of the substantial completion of the lane change by said lane change confirming means.

28. A steering assist system in a vehicle according to claim 2 or 4, wherein said control unit is arranged to enable the reduction of said connection course in response to the confirmation of the substantial completion of the lane change by said lane change confirming means, and to carry out the replacement of said second lane by the reference lane or the replacement of said second target course by said reference target course after completion of the reduction of said connection course (zone).

29. A steering assist system in a vehicle according to claim 20, wherein said control unit is arranged to replace said second lane by the reference lane, or replace said second target course by said reference target course after completion of the increasing of the second induction force.

30. A steering assist system in a vehicle according to claim 5, wherein the criterion of determination in the intention perceiving means is the operation of the blinker provided by the driver.

31. A steering assist system in a vehicle according to claim 5, wherein the criterion of determination in the intention perceiving means is in that the deviation of the subject vehicle is equal to or larger than a first predetermined value, or in that the state in which the deviation of the subject vehicle from said reference target course is equal to or larger than the first predetermined value is continued for a predetermined time or more.

32. A steering assist system in a vehicle according to claim 5, wherein the criterion of determination in the intention perceiving means is in that at least a portion of the subject vehicle exists on said second lane.

33. A steering assist system in a vehicle according to claim 5, further including a steering force detecting means for detecting a steering force, and wherein the criterion of determination in the intention perceiving means is in that the detection value detected by said steering force detecting means is equal to or larger than a predetermined value, or in that the detection value detected by said steering force detecting means is equal to or larger than the predetermined value continuously for the predetermined time or more.

34. A steering assist system in a vehicle according to claim 5, further including a steering speed detecting means for detecting a steering speed, and wherein the criterion of determination in the intention perceiving means is in that the detection value detected by said steering speed detecting means is equal to or larger than a predetermined value.

35. A steering assist system in a vehicle according to claim 5, further including a course-maintaining steering angle calculating means for calculating a steering angle required for maintaining the relationship in relative position between said reference lane and the subject vehicle, and a steering angle detecting means for detecting a current steering angle, and wherein the criterion of determination in said intention perceiving means is in that the difference between outputs from said course-maintaining steering angle calculating means and said steering angle detecting means is equal to or larger than a predetermined value, or in that the difference between outputs from said course-maintaining steering angle calculating means and said steering angle detecting means is equal to or larger than the predetermined value continuously for a predetermined time or more.

36. A steering assist system in a vehicle according to claim 5, wherein the criterion of determination in said intention perceiving means is in that the deviation of the subject vehicle from said reference target course is increased or not decreased.

37. A steering assist system in a vehicle according to claim 2 or 4, wherein the criterion of confirmation of the substantial execution by said lane change confirming means is the canceling of the blinker.

38. A steering assist system in a vehicle according to claim 2 or 4, wherein the criterion of confirmation of the substantial execution by said lane change execution confirming means is in that the deviation of the subject vehicle from said reference target course is equal to or larger than the second predetermined value.

39. A steering assist system in a vehicle according to claim 2 or 4, wherein the criterion of confirmation of the substantial execution by said lane change execution confirming means is in that the deviation of the subject vehicle from said reference target course is increased or not decreased.

40. A steering assist system in a vehicle according to claim 2 or 4, wherein the criterion of confirmation of the substantial completion by said lane change execution confirming means is in that the deviation of the subject vehicle from said second target course is equal to or smaller than a predetermined value, or in that the deviation of the subject vehicle from said reference target course is equal to or larger than a predetermined value.

41. A steering assist system in a vehicle according to claim 2 or 4, further including a course-maintaining steering angle calculating means for calculating a steering angle required for maintaining the relationship in relative position between said second lane and the subject vehicle, and a steering angle detecting means for detecting a current steering angle, and wherein the criterion of confirmation of the substantial completion by said lane change confirming means is in that the difference between outputs from said course-maintaining steering angle calculating means and said steering angle detecting means is smaller than a predetermined value.

42. A steering assist system in a vehicle according to claim 2 or 4, wherein the criterion of confirmation of the substantial non-execution by said lane change confirming means is in that the deviation of the subject vehicle from the reference target course is smaller than a predetermined value during canceling of the blinker, or in that the deviation of the subject vehicle from said reference target course is decreased after canceling of the blinker.

43. A steering assist system in a vehicle according to claim 2 or 4, wherein the criterion of confirmation of the substantial non-execution by said lane change confirming means is in that the deviation of the subject vehicle from the reference target course is increased to exceed a predetermined value and then decreased to smaller than said predetermined value, or in that the deviation of the subject vehicle from the reference target course is increased to exceed a predetermined value and then decreased to smaller than another predetermined value smaller than said predetermined value smaller.

44. A steering assist system in a vehicle according to claim 2 or 4, further including a course-maintaining steering angle calculating means for calculating a steering angle required for maintaining the relationship in relative position between said reference lane and the subject vehicle, and a steering angle detecting means for detecting a current steering angle, and wherein the criterion of confirmation of the substantial non-execution by said lane change confirming means is in that the difference between outputs from said course-maintaining steering angle calculating means and said steering angle detecting means is increased to exceed a predetermined value and then decreased to smaller than said predetermined value, or in that the difference between outputs from said course-maintaining steering angle calculating means and said steering angle detecting means is increased to exceed a predetermined value and then decreased to smaller than another predetermined value smaller than said predetermined value smaller.

45. A steering assist system in a vehicle according to claim 2 or 4, further including a course-maintaining steering angle calculating means for calculating a steering angle required for maintaining the relationship in relative position between said reference lane and the subject vehicle, and a steering angle detecting means for detecting a current steering angle, and wherein the criterion of confirmation of the substantial non-execution by said lane change confirming means is in that the difference between outputs from said course-maintaining steering angle calculating means and said steering angle detecting means is equal to or smaller than a predetermined value during canceling of the blinker.

46. A steering assist system in a vehicle according to claim 7, wherein the criterion of determination in the intention perceiving means is the operation of the blinker provided by the driver.

47. A steering assist system in a vehicle according to claim 7, wherein the criterion of determination in the intention perceiving means is in that the deviation of the subject vehicle is equal to or larger than a first predetermined value, or in that the state in which the deviation of the subject vehicle from said reference target course is equal to or larger than the first predetermined value is continued for a predetermined time or more.

48. A steering assist system in a vehicle according to claim 7, wherein the criterion of determination in the intention perceiving means is in that at least a portion of the subject vehicle exists on said second lane.

49. A steering assist system in a vehicle according to claim 7, further including a steering force detecting means for detecting a steering force, and wherein the criterion of determination in the intention perceiving means is in that the detection value detected by said steering force detecting means is equal to or larger than a predetermined value, or in that the detection value detected by said steering force detecting means is equal to or larger than the predetermined value continuously for the predetermined time or more.

50. A steering assist system in a vehicle according to claim 7, further including a steering speed detecting means for detecting a steering speed, and wherein the criterion of determination in the intention perceiving means is in that the detection value detected by said steering speed detecting means is equal to or larger than a predetermined value.

51. A steering assist system in a vehicle according to claim 7, further including a course-maintaining steering angle calculating means for calculating a steering angle required for maintaining the relationship in relative position between said reference lane and the subject vehicle, and a steering angle detecting means for detecting a current steering angle, and wherein the criterion of determination in said intention perceiving means is in that the difference between outputs from said course-maintaining steering angle calculating means and said steering angle detecting means is equal to or larger than a predetermined value, or in that the difference between outputs from said course-maintaining steering angle calculating means and said steering angle detecting means is equal to or larger than the predetermined value continuously for a predetermined time or more.

52. A steering assist system in a vehicle according to claim 7, wherein the criterion of determination in said intention perceiving means is in that the deviation of the subject vehicle from said reference target course is increased or not decreased.

53. A steering assist system in a vehicle having a lane change function during forward traveling of the vehicle, comprising a steering means for steering the vehicle by applying an induction force, and a control unit for applying to said steering means a reference induction force for causing the vehicle to travel along a reference lane while the vehicle is traveling forward, said control unit having means for determining a lane-change induction force to be applied to said steering for causing the vehicle to change lanes to travel forward along a new lane, in accordance with the magnitude and direction of the deviation of the vehicle from said new lane, said control unit having means for controlling said reference induction force and said lane-change induction force for allowing a driver of the vehicle to manually steer the vehicle from the reference lane to the new lane while traveling forward without a force above a predetermined level being applied on said steering means by said reference induction force and said lane-change induction force.

* * * * *